(12) United States Patent
Kubota et al.

(10) Patent No.: US 10,784,514 B2
(45) Date of Patent: Sep. 22, 2020

(54) CONDUCTIVE CARBON, ELECTRODE MATERIAL INCLUDING SAID CONDUCTIVE CARBON, AND ELECTRODE USING SAID ELECTRODE MATERIAL

(71) Applicant: NIPPON CHEMI-CON CORPORATION, Tokyo (JP)

(72) Inventors: Satoshi Kubota, Tokyo (JP); Yoshihiro Minato, Tokyo (JP); Shuichi Ishimoto, Tokyo (JP); Kenji Tamamitsu, Tokyo (JP); Katsuhiko Naoi, Tokyo (JP); Wako Naoi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 16/387,652

(22) Filed: Apr. 18, 2019

(65) Prior Publication Data

US 2019/0245209 A1 Aug. 8, 2019

Related U.S. Application Data

(62) Division of application No. 15/123,579, filed as application No. PCT/JP2015/056562 on Mar. 5, 2015, now Pat. No. 10,573,896.

(30) Foreign Application Priority Data

Mar. 5, 2014 (JP) ................................ 2014-043358
May 19, 2014 (JP) ................................ 2014-103849

(51) Int. Cl.
*H01M 4/62* (2006.01)
*H01G 11/86* (2013.01)
(Continued)

(52) U.S. Cl.
CPC ............ *H01M 4/625* (2013.01); *H01G 11/24* (2013.01); *H01G 11/42* (2013.01); *H01G 11/44* (2013.01);
(Continued)

(58) Field of Classification Search
CPC ....... H01M 4/625; H01M 4/043; H01G 11/86
See application file for complete search history.

(56) References Cited

U.S. PATENT DOCUMENTS

2010/0075229 A1 3/2010 Atsuki et al.
2012/0156560 A1 6/2012 Hong et al.

FOREIGN PATENT DOCUMENTS

JP   2004-134304 A   4/2004
JP   2006-261062 A   9/2006
(Continued)

OTHER PUBLICATIONS

International Search Report for PCT/JP2015/056562 dated Jun. 9, 2015.
(Continued)

*Primary Examiner* — Maria Laios
(74) *Attorney, Agent, or Firm* — Birch, Stewart, Kolasch & Birch, LLP

(57) ABSTRACT

Provided is conductive carbon that gives an electrical storage device having a high energy density. This conductive carbon includes a hydrophilic part, and the contained amount of the hydrophilic part is 10 mass % or more of the entire conductive carbon. When performing a rolling treatment on an active material layer including an active material particle and this conductive carbon formed on a current collector during manufacture of an electrode of an electric storage device, the pressure resulting from the rolling treatment causes this conductive carbon to spread in a paste-like form and increase in density. The active material particles approach each other, and the conductive carbon is pressed into gaps formed between adjacent active material particles, filling the gaps. As a result, the amount of active material per unit volume in the electrode obtained after the rolling treatment increases, and the electrode density increases.

20 Claims, 12 Drawing Sheets

(51) Int. Cl.
*H01G 11/24* (2013.01)
*H01G 11/42* (2013.01)
*H01G 11/44* (2013.01)
*H01M 4/131* (2010.01)
*H01M 4/136* (2010.01)
*H01M 4/58* (2010.01)
*H01M 4/04* (2006.01)
H01M 4/505 (2010.01)
H01M 4/525 (2010.01)
H01M 4/02 (2006.01)

(52) U.S. Cl.
CPC ............ *H01G 11/86* (2013.01); *H01M 4/043* (2013.01); *H01M 4/131* (2013.01); *H01M 4/136* (2013.01); *H01M 4/5825* (2013.01); H01M 4/505 (2013.01); H01M 4/525 (2013.01); H01M 2004/021 (2013.01); Y02E 60/13 (2013.01)

(56) References Cited

FOREIGN PATENT DOCUMENTS

| | | |
|---|---|---|
| JP | 2007-103066 A | 4/2007 |
| JP | 2009-35598 A | 2/2009 |
| JP | 2012-99436 A | 5/2012 |
| JP | 2012-528451 A | 11/2012 |
| WO | WO 2009/098986 A1 | 8/2009 |

OTHER PUBLICATIONS

Written Opinion of the International Searching Authority for PCT/JP2015/056562 (PCT/ISA/237) dated Jun. 9, 2015.

(A)　　　　　　　　　　　　(B)

(A)　　　　　　　　　　　　(B)

use of acetylene black use of carbon in Example 1 use of acetylene black use of carbon in Example 1

CONDUCTIVE CARBON, ELECTRODE MATERIAL INCLUDING SAID CONDUCTIVE CARBON, AND ELECTRODE USING SAID ELECTRODE MATERIAL

CROSS-REFERENCE TO RELATED APPLICATION

This application is a Divisional application of co-pending U.S. application Ser. No. 15/123,579, filed on Sep. 2, 2016, which is the National Phase under 35 U.S.C. § 371 of International Application No. PCT/JP2015/056562, filed on Mar. 5, 2015, which claims the benefit under 35 U.S.C. § 119(a) to Patent Application No. 2014-043358, filed in Japan on Mar. 5, 2014 and Patent Application No. 2014-103849, filed in Japan on May 19, 2014, all of which are hereby expressly incorporated by reference into the present application.

TECHNICAL FIELD

The present invention relates to conductive carbon that is used in an electric storage device with a high energy density such as a secondary battery, an electric double layer capacitor, a redox capacitor and a hybrid capacitor. This invention also relates to an electrode material comprising the conductive carbon and an electrode for an electric storage device in which this electrode material is used.

THE RELATED ART

An electric storage device such as a secondary battery, an electric double layer capacitor, a redox capacitor and a hybrid capacitor is a device that is under consideration for wider application as a battery for an information device including a cellphone and a notebook-sized personal computer, for a motor drive power supply of a low-emission vehicle such as an electric vehicle and a hybrid vehicle, and for an energy recovery system, etc. In these devices, improvement in energy density is desired to meet the requirements of higher performance and downsizing.

In these electric storage devices, an electrode active material that realizes its capacity by a faradaic reaction involving the transfer of an electron with an ion in an electrolyte (including an electrolytic solution) or by a non-faradaic reaction not involving the transfer of an electron is used for energy storage. Further, this active material is generally used in the form of a composite material with an electroconductive agent. As the electroconductive agent, conductive carbon such as carbon black, natural graphite, artificial graphite, and carbon nanotube is generally used. This conductive carbon, used concurrently with a low conductive active material, serves to add conductivity to the composite material, and furthermore, acts as a matrix to absorb the volume change in accordance with the reaction of the active material. Also, it serves to ensure an electron conducting path when the active material is mechanically damaged.

The composite material of the active material and the conductive carbon is generally manufactured by a method of mixing particles of the active material and the conductive carbon. The conductive carbon does not make a significant contribution to the improvement of the energy density of an electric storage device, so the quantity of the conductive carbon per unit volume needs to be decreased and that of the active material needs to be increased to obtain an electric storage device with a high energy density. Therefore, consideration is given to a method to decrease the distance between the particles of the active material to increase the quantity of the active material per unit volume by improving the dispersibility of the conductive carbon or by reducing the structure of the conductive carbon.

For example, Patent Document 1 (JP 2004-134304 A) discloses a nonaqueous secondary battery that is equipped with a positive electrode that contains a small-sized carbon material having an average primary particle diameter of 10 to 100 nm (in its example, acetylene black) and that has a degree of blackness of 1.20 or more. A coating material used to form the positive electrode is obtained either by dispersing a mixture of an active material for a positive electrode, the abovementioned carbon material, a binder and a solvent by a high shear dispersing machine such as a high speed rotational homogenizer dispersing machine or a planetary mixer with three or more rotary axes, or by adding a dispersion body, in which a mixture of the abovementioned carbon material, a binder and a solvent are dispersed by a high shear dispersing machine, into a paste in which a mixture of the active material for a positive electrode, a binder and a solvent are dispersed, and further dispersing. By using the device that has a high shearing force, the carbon material, which is hard to disperse because of its small particle size, becomes evenly dispersed.

Also, Patent Document 2 (JP 2009-35598 A) discloses an electroconductive agent for an electrode for a nonaqueous secondary battery that consists of acetylene black whose BET-specific surface area is 30 to 90 $m^2/g$, dibutylphthalate (DBP) oil absorption quantity is 50 to 120 mL/100 g, and pH is 9 or more. The electrode for the secondary battery is formed by dispersing a mixture of this acetylene black and an active material in a fluid containing a binder to prepare slurry, and applying this slurry on a current collector and drying it. Since the acetylene black with the abovementioned characteristics has a smaller structure compared with Ketjen Black or other conventional acetylene blacks, the bulk density of a mixture of the acetylene black and the active material is improved and the battery capacity is improved.

PRIOR ARTS DOCUMENTS

Patent Documents

Patent Document 1: JP 2004-134304 A
Patent Document 2: JP 2009-35598 A

SUMMARY OF THE INVENTION

Problems to be Solved by the Invention

Further improvement of an electric storage device in terms of energy density is always desired. However, the inventors have examined the prior arts and found that even by the methods disclosed in Patent Documents 1 and 2, it is difficult to enable conductive carbon to infiltrate efficiently between particles of an active material, and therefore, it is difficult to shorten the distance between the active material particles and increase the amount of the active material per unit volume. Therefore, the inventors have found that there is a limitation to the improvement of the energy density with a positive electrode and/or a negative electrode using the composite material of particles of an active material and conductive carbon.

Therefore, the objective of the present invention is to provide conductive carbon that gives an electric storage device with a high energy density.

Means for Solving Problems

After a keen examination, the inventors have found that electrode density significantly increases by forming an electrode of an electric storage device by using a composite material of conductive carbon, which is obtained by giving a strong oxidizing treatment to a raw material of conductive carbon, and a particle of an active material. Moreover, extensive analysis of the conductive carbon used has revealed that a conductive carbon gives an electric storage device with a high energy density if the conductive carbon comprises a lot of hydrophilic part and the contained amount of the hydrophilic part is 10% by mass or more of the entire conductive carbon.

Therefore, the present invention, first of all, relates to conductive carbon for an electrode of an electric storage device, wherein the conductive carbon comprises a hydrophilic part, and the contained amount of the hydrophilic part is 10% by mass or more of the entire conductive carbon.

In the present invention, the "hydrophilic part" of conductive carbon means the following: 0.1 g of conductive carbon is added to 20 ml of an ammonia aqueous solution with pH 11, ultrasonic irradiation is applied for 1 minute, and a fluid obtained is left for 5 hours to precipitate its solid phase part. The part that does not precipitate and is dispersed in the ammonia aqueous solution with pH 11 is the "hydrophilic part." Also, the contained amount of the hydrophilic part in the entire conductive carbon can be calculated by the following method: After the precipitation of the solid phase part, the supernatant fluid is removed, the remaining part is dried, and the weight of the solid object after drying is measured. The weight calculated by subtracting the weight of the solid object after drying from the weight of the initial conductive carbon (0.1 g) is the weight of the "hydrophilic part," which is dispersed in the ammonia aqueous solution with pH 11. The weight ratio of the weight of the "hydrophilic part" against the weight of the initial conductive carbon (0.1 g) is the contained amount of the "hydrophilic part" in the conductive carbon.

The ratio of the hydrophilic part in conductive carbon such as carbon black, natural graphite and carbon nanotube, which is used as a conductive agent in an electrode of a conventional electric storage device, is 5% by mass or less of the entire conductive carbon. However, by using these conductive carbons as raw materials and giving an oxidizing treatment to these raw materials, the surface of their particles is oxidized and a hydroxy group, a carboxy group and an ether bond are introduced into the carbon, and a conjugated double bond of the carbon is oxidized so that a carbon single bond is formed, a carbon-carbon bond is partially severed, and a hydrophilic part is formed on the surface of the particles. Then, as the intensity of the oxidizing treatment is increased, the percentage of the hydrophilic part in the carbon particle is increased and the hydrophilic part accounts for 10% by mass or more of the entire conductive carbon, and particles aggregate by the intermediary of this hydrophilic part.

FIG. 1 is a model drawing to show the change in such an aggregated body when pressure is applied to the aggregated body. As pressure is applied to the aggregated body aggregated by the intermediary of the hydrophilic part as shown in the upper drawing of FIG. 1, a vulnerable hydrophilic part becomes unable to bear the pressure and the aggregated body collapses as shown in the middle drawing of FIG. 1. As pressure is further increased, not only the hydrophilic part on the surface of carbon particles, but also a non-oxidized part at the center of the particles is transformed or partially collapses and the entire aggregate body becomes compressed. However, the hydrophilic part of the carbon particles serves as a binder even when the aggregate body is compressed, and as shown in the lower drawing of FIG. 1 the non-oxidized part and the hydrophilic part of the carbon particles become unified and spread in a paste-like manner. Then the carbon that spreads in a paste-like manner is compressed extremely densely. The word "paste-like" refers to a condition in which the grain boundary of carbon primary particles is not observed and non-particulate amorphous carbons are connected with each other in an SEM image at a magnification of 25,000.

The conductive carbon of the present invention is characterized as easily attachable to the surface of the particles of the active material and it is compressed integrally and spreads in a paste-like manner when pressure is applied to it, and is hard to separate. Therefore, when the conductive carbon of the present invention and the particles of an active material are mixed and an electrode material is obtained for an electrode of an electric storage device, the conductive carbon is attached to and covers the surface of the particles of the active material in the process of mixing and the dispersity of the particles of the active material is improved. When the pressure applied to the conductive carbon in manufacturing the electrode material is large, at least part of the conductive carbon spreads in a paste-like manner and the surface of the particles of the active material becomes partially covered. Moreover, if an active material layer is formed with this electrode material on a current collector of an electrode and pressure is applied to the active material layer, as shown in the lower drawing of FIG. 1 most or all of the conductive carbon of the present invention spreads in a paste-like manner and becomes dense while covering the surface of the particles of the active material, the particles of the active material approach each other, and accordingly the conductive carbon of the present invention is pushed out not only into the gap that is formed between the adjacent particles of the active material, but also into pores that exist on the surface of the particles of the active material (including gaps between primary particles that are found in secondary particles) and fill the gaps and pores while covering the surface of the particles of the active material (see FIG. 3). Therefore, the amount of the active material per unit volume in the electrode is increased and electrode density is increased. Moreover, the paste-like conductive carbon that is densely filled has sufficient conductivity to serve as a conductive agent and does not inhibit the impregnation of an electrolytic solution in the electric storage device. As a result, the energy density of the electric storage device is improved.

On the other hand, when conductive carbon such as carbon black that is used as a conductive agent in an electrode of a conventional electric storage device, or an oxide of such carbon that does not have sufficient oxidizing intensity, in which the contained amount of the hydrophilic part is less than 10% by mass of the entire conductive carbon, is used to compose an electrode of an electric storage device, the increase in electrode density is not sufficient. In the conductive carbon of the present invention, it is preferable that the contained amount of the hydrophilic part is 12% by mass or more and 30% by mass or less so that an especially high electrode density can be obtained.

The conductive carbon of the present invention can be suitably manufactured by a oxidizing treatment of a carbon raw material having an inner vacancy. The inner vacancy includes a pore in porous carbon powder as well as a hollow of Ketjen Black, an internal or interstitial pore of a carbon nanofiber or a carbon nanotube.

As mentioned above, when a composite material of the conductive carbon of the present invention and particles of an electrode active material is employed as an electrode material to form an electrode of an electric storage device, the energy density of the electric storage device is improved. Therefore, the present invention also relates to an electrode material that is an electrode material for an electric storage device and comprises the conductive carbon of this invention and an electrode active material particle.

In the electrode material of the present invention, it is preferable that an average diameter of the electrode active material particles is within a range of 0.01 to 2 μm. Since the conductive carbon of the present invention attaches to and covers the surface of the particles of the active material, aggregation of the active material particles can be inhibited even if the average diameter of the particles of the active material is as small as 0.01 to 2 μm.

In the electrode material of the present invention, it is preferable that the electrode active material particles are composed of fine particles with an average diameter of 0.01 to 2 μm that are operable as a positive electrode active material or a negative electrode active material and gross particles with an average diameter of more than 2 μm and not more than 25 μm that are operable as an active material of the same electrode as the fine particles. The gross particles increase the electrode density and improve the energy density of an electric storage device. Also, due to the pressure applied to the electrode material in manufacturing the electrode, the fine particles press the conductive carbon of the present invention, and are pushed out into and fill the gaps that are formed between adjacent gross particles together with the conductive carbon, so that the electrode density further increases and the energy density of the electric storage device further improves. The average diameter of the active material particles is the 50% radius (median diameter) as in the measurement of particle size distribution obtained by using a light scattering particle size meter.

In the electrode material of the present invention, it is preferable that another kind of conductive carbon, especially conductive carbon that has higher electroconductivity than the conductive carbon of the present invention, is further comprised. When pressure is applied to the electrode material when the electrode is manufactured, this carbon also densely fills the gaps formed by the adjacent particles of an active material together with the conductive carbon of the present invention and the conductivity of the whole electrode is improved, so that the energy density of an electric storage device further improves.

As mentioned above, the energy density of an electric storage device is improved when the electrode of the electric storage device is composed with the electrode material that comprises the conductive carbon of the present invention and an active material particle. Therefore, the present invention also relates to an electrode for an electric storage device which comprises an active material layer formed by adding pressure to the electrode material of the present invention. Also, it has been found that the dissolution of the active material by an electrolytic solution in the electric storage device is significantly inhibited and the cycle characteristic of the electric storage device is significantly improved, conceivably because most or all of the surface of the particles of the active material in the electrode, including the inside of the pores that exist on the surface of the particles of the active material, is covered by the conductive carbon of the present invention that spreads in a paste-like manner.

Advantageous Effects of the Invention

The conductive carbon of the present invention attaches easily to the surface of the particles of the active material and it is compressed integrally and spreads in a paste-like manner when pressure is applied to it, and is hard to separate, so that the conductive carbon is attached to and covers the surface of the particles of an active material in the process of mixing the conductive carbon of the present invention and the particles of the active material and obtaining the electrode material, and the dispersity of the particles of the active material is improved. Also, in manufacturing the electrode of the electric device, when pressure is applied to the electrode material comprising the particles of an active material and the conductive carbon of the present invention, due to the pressure most or all of the conductive carbon of the present invention spreads in a paste-like manner and becomes dense while covering the surface of the particles of the active material, the particles of the active material approach each other, and accordingly the conductive carbon of the present invention is pushed out not only into the gap that is formed between the adjacent particles of the active material, but also into pores that exist on the surface of the particles of the active material and fill the gaps and pores densely. Therefore, the amount of the active material per unit volume in the electrode is increased and electrode density is increased. Moreover, the paste-like conductive carbon that is densely filled has sufficient conductivity to serve as a conductive agent and does not inhibit the impregnation of an electrolytic solution in the electric storage device. As a result, the energy density of the electric storage device is improved.

DETAILED DESCRIPTION OF THE INVENTION

Figure 1:
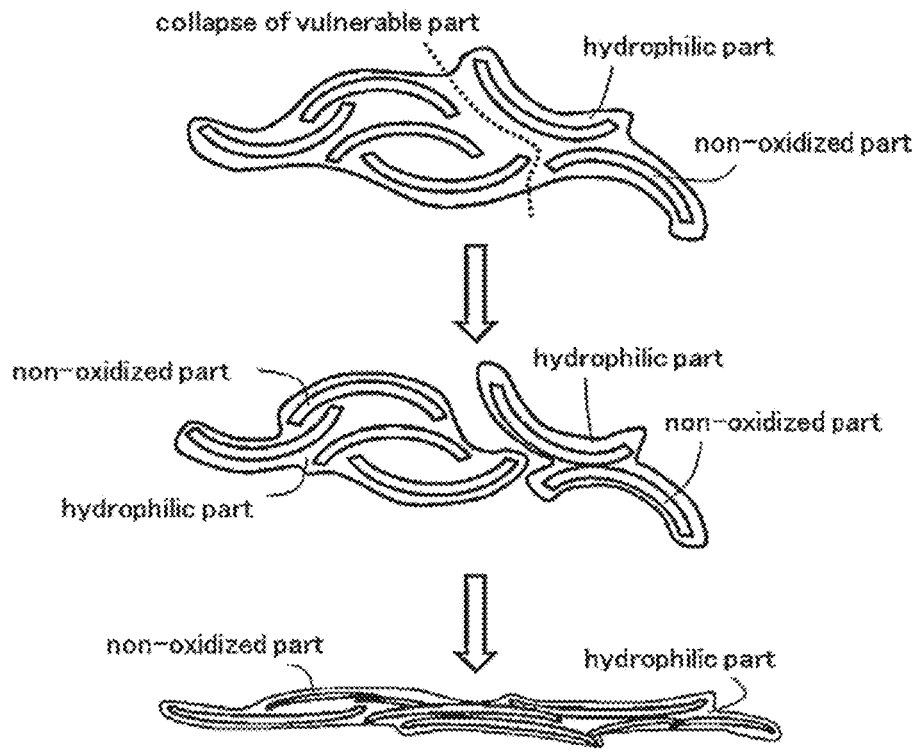
FIG. 1 shows a model drawing that shows the change in an aggregated body of conductive carbon of a working example when pressure is applied to the aggregated body.

The conductive carbon of the present invention has a hydrophilic part and the contained amount of the hydrophilic part is 10% by mass or more, preferably 12% by mass or more and 30% by mass or less, of the entire conductive carbon. When an oxidizing treatment is applied to a carbon raw material, preferably a carbon raw material with an inner vacancy, the surface of its particles is oxidized, and a hydroxy group, a carboxy group and an ether bond are introduced into the carbon, and a conjugated double bond of the carbon is oxidized, so that a carbon single bond is formed, a carbon-carbon bond is partially severed, and a hydrophilic part is formed on the surface of the particles. Then, as the intensity of the oxidizing treatment is increased, the ratio of the hydrophilic part in the carbon particle is increased and the hydrophilic part accounts for 10% by mass or more of the entire conductive carbon.

Such conductive carbon easily attaches to the surface of the particles of the active material and it is compressed integrally and spreads in a paste-like manner when pressure is applied to it, and is hard to separate.

The conductive carbon of the present invention can be suitably obtained by the first manufacturing method comprising:

(a1) a process in which acidic treatment is given to a carbon raw material with an inner vacancy;

(b1) a process in which the product after acidic treatment and a transition metal compound are mixed;

(c1) a process in which the mixture obtained is pulverized to produce a mechanochemical reaction;

(d1) a process in which the product after the mechanochemical reaction is heated in a nonoxidizing atmosphere; and (e1) a process in which the aforementioned transition metal compound and/or its reaction product is removed from the product after heating.

In the first manufacturing method, carbon with an inner vacancy such as porous carbon powder, Ketjen Black furnace black with pores, carbon nanofiber and carbon nanotube is used as the carbon raw material. As such a carbon raw material with an inner vacancy, the use of carbon in which the specific surface area of micropores, which have a diameter of 2 nm or less as measured by the MP method, is 200 $m^2/g$ or more is preferable, the use of carbon in which the average primary particle diameter is 200 nm or less is preferable, and the use of carbon in which the shape of the particles are spherical is preferable. The carbon raw material within these ranges is easily denatured into the conductive carbon of the present invention by the first manufacturing method. Especially, spherical particles such as Ketjen Black and furnace black with pores are preferable. It is difficult to obtain the conductive carbon of the present invention by using solid carbon as a raw material and applying the same treatment as the first manufacturing method to the solid carbon.

In the (a1) process, the carbon raw material is left immersed in acid. An ultrasonic wave can be irradiated during this immersion. As acid, an acid usually used for an oxidizing treatment of carbon such as nitric acid, a mixture of nitric acid and sulfuric acid, and an aqueous solution of hypochlorous acid can be used. The immersion time depends on the concentration of acid or the quantity of the carbon raw material to be treated, and is usually within the range of 5 minutes to 5 hour. The carbon after acidic treatment is sufficiently washed by water and dried, and then mixed with a transition metal compound in the (b1) process.

For the chemical compound of transition metal to be added to the carbon raw material in the (b1) process, an inorganic metallic salt of transition metal such as a halide, nitrate, sulfate and carbonate; an organic metallic salt of transition metal such as formate, acetate, oxalate, methoxide, ethoxide and isopropoxide; or a mixture thereof can be used. These chemical compounds can be used alone, or two or more kinds can be used as a mixture. Chemical compounds that contain different transition metals can be mixed in a prescribed amount and used. Also, a chemical compound other than the chemical compound of transition metal, such as an alkali metal compound, can be added concurrently unless it has an adverse effect on the reaction.

Since the conductive carbon of the present invention is mixed with particles of an active material and used in manufacturing an electrode of an electric storage device, it is preferable that a chemical compound of an element constituting the active material is added to the carbon raw material so that adulteration of an element that can serve as impurities against the active material can be prevented.

In the (c1) process, the mixture obtained in the (b1) process is pulverized and a mechanochemical reaction is produced. Examples of a powdering machine for this reaction are a mashing machine, ball mill, bead mill, rod mill, roller mill, agitation mill, planetary mill, vibrating mill, hybridizer, mechanochemical composite device and jet mill. Milling time depends on the powdering machine used or the quantity of the carbon to be treated and has no strict restrictions, but is generally within the range of 5 minutes to 3 hours. The (d1) process is conducted in a nonoxidizing atmosphere such as a nitrogen atmosphere and an argon atmosphere. The temperature and time of heating is chosen in accordance with the chemical compound of transition metal used. In the subsequent (e1) process, the conductive carbon of the present invention can be obtained by removing the chemical compound of transition metal and/or its reaction product from the product that has been heated by means of acid dissolution etc., then sufficiently washing and drying.

In the first manufacturing method, the chemical compound of transition metal promotes the oxidation of the carbon raw material by the mechanochemical reaction in the (c1) process, and the oxidation of the carbon raw material rapidly proceeds. By this oxidation, the conductive carbon that comprises a hydrophilic part, which is 10% by mass or more of the entire conductive carbon, can be obtained.

The conductive carbon of the present invention can also be suitably obtained by the second manufacturing method that comprises:

(a2) a process in which a carbon raw material with an inner vacancy and a chemical compound of transition metal are mixed;
(b2) a process in which the mixture obtained is heated in an oxidizing atmosphere; and
(c2) a process in which the abovementioned chemical compound of transition metal and/or its reaction product is removed from the product after heat treatment.

In the second manufacturing method, as the carbon raw material, carbon with an inner vacancy such as porous carbon powder, Ketjen Black, furnace black with pores, carbon nanofiber and carbon nanotube is used. As a carbon raw material with an inner vacancy, the use of carbon in which the specific surface area of micropores, which have a diameter of 2 nm or less as measured by the MP method, is 200 $m^2$/g or more, is preferable, the use of carbon in which the average primary particle diameter is 200 nm or less is preferable, and the use of carbon in which the shape of the particles is spherical is preferable. The carbon raw material within these ranges is easily denatured into the conductive carbon of the present invention by the second manufacturing method. Especially, spherical particles such as Ketjen Black and furnace black with pores are preferable. It is difficult to obtain the conductive carbon of the present invention by using solid carbon as a raw material and giving the same treatment as the second manufacturing method to the solid carbon.

As the chemical compound of transition metal to be added to the carbon raw material in the (a2) process, an inorganic metallic salt of transition metal such as a halide, nitrate, sulfate and carbonate; an organic metallic salt of transition metal such as formate, acetate, oxalate, methoxide, ethoxide and isopropoxide; or a mixture thereof can be used. These chemical compounds can be used alone, or two or more kinds can be mixed and used. Chemical compounds that contain different transition metals can be mixed in a prescribed amount and used. Moreover, a chemical compound other than a chemical compound of transition metal such as a chemical compound of alkali metal can be added concurrently unless it has an adverse effect on the reaction. This conductive carbon is mixed with particles of an active material and used in manufacturing an electrode of an electric storage device, so it is preferable to add a chemical compound of an element that constitutes the active material to the carbon raw material because this will prevent the mixing of an element that can be impurities against the active material.

The (b2) process is conducted in an oxidizing atmosphere, for example in air, and at a temperature at which carbon partially disappears but not completely disappears, preferably at a temperature of 200 to 350° C. In the subsequent (c2) process, the conductive carbon of the present invention can be obtained by removing the chemical compound of transition metal and/or its reaction product from the product that has been heated by means of acid dissolution etc., then sufficiently washing and drying.

In the second manufacturing method, the chemical compound of transition metal acts as a catalyst to oxidize the carbon raw material in the heating process in an oxidizing atmosphere and the oxidation of the carbon raw material rapidly proceeds. By this oxidation, the conductive carbon that comprises a hydrophilic part, which is 10% by mass or more of the entire conductive carbon, can be obtained.

The conductive carbon of the present invention can be obtained by giving a strong oxidizing treatment to a carbon raw material, but it is also possible to promote the oxidation of the carbon raw material by a method other than the first manufacturing method or the second manufacturing method.

The conductive carbon of the present invention is used for an electrode of an electric storage device such as a secondary battery, an electric double layer capacitor, a redox capacitor and a hybrid capacitor in an embodiment in which the conductive carbon of the present invention is mixed with a particle of an electrode active material that realizes its capacity by a faradaic reaction that involves the transfer of an electron between an ion in an electrolyte of the electric storage device or a nonfaradaic reaction that does not involve the transfer of an electron. The electric storage device comprises a pair of electrodes (a positive electrode and a negative electrode) and an electrolyte that is placed between the electrodes as essential elements, and at least one of the positive electrode and the negative electrode is manufactured with an electrode material comprising the conductive carbon of the present invention and an electrode active material particle.

The electrolyte that is placed between a positive electrode and a negative electrode in an electric storage device can be an electrolytic solution that is held by a separator, a solid electrolyte, or a gel electrolyte, that is, an electrolyte that is used in a conventional electric storage device can be used without any restrictions. Representative electrolytes are as follows. For a lithium ion secondary battery, an electrolytic solution in which a lithium salt such as $LiPF_6$, $LiBF_4$, $LiCF_3SO_3$ and $LiN(CF_3SO_2)_2$ is dissolved in a solvent such as ethylene carbonate, propylene carbonate, butylene carbonate and dimethylcarbonate can be used and held by a separator such as polyolefin fiber nonwoven fabric and glass fiber nonwoven fabric. Further, an inorganic solid electrolyte such as $Li_5La_3Nb_2O_{12}$, $Li_{1.5}Al_{0.5}Ti_{1.5}(PO_4)_3$, $Li_7La_3Zr_2O_{12}$ and $Li_7P_3S_{11}$, an organic solid electrolyte that is composed of a complex of a lithium salt and a macromolecule compound such as polyethylene oxide, polymethacrylate and polyacrylate, and a gel electrolyte in which an electrolytic solution is absorbed into polyvinylidene fluoride and polyacrylonitrile etc. are also used. For an electric double layer capacitor and a redox capacitor, an electrolytic solution in which a quaternary ammonium salt such as $(C_2H_5)_4NBF_4$ is dissolved in a solvent such as acrylonitrile and propylene carbonate is used. For a hybrid capacitor, an electrolytic solution in which a lithium salt is dissolved in propylene carbonate etc. or an electrolytic solution in which a quaternary ammonium salt is dissolved into propylene carbonate etc. is used.

The positive electrode or negative electrode of an electric storage device is generally manufactured by sufficiently kneading an electrode material comprising the conductive carbon of the present invention and the particles of an electrode active material together with a solvent in which a binder is dissolved as needed, forming an active material layer by applying the kneaded material obtained onto a current collector to form the positive electrode or negative electrode of the electric storage device, drying this active material layer as needed, and then giving the active material layer a rolling treatment. In the case where a solid electrolyte or a gel electrolyte is used as an electrolyte between a positive electrode and a negative electrode, a solid electrolyte is added to an electrode material comprising the conductive carbon of the present invention and an electrode active material particle in order to ensure an ion conductive pass in the active material layer. The mixture obtained is sufficiently kneaded together with a solvent in which a binder is dissolved as needed, an active material layer is formed using the kneaded material obtained.

In the process of manufacturing an electrode material by mixing the conductive carbon of the present invention and the particles of an electrode active material, aggregation of the particles of an active material can be inhibited because the conductive carbon is attached to and covers the surface of the particles of the active material. If the pressure applied to the conductive carbon in manufacturing the electrode material is large, at least part of the conductive carbon spreads in a paste-like manner and the surface of the particles of an electrode active material is partially covered. Also, by the pressure applied during a rolling treatment to an active material layer, most or all of the conductive carbon of the present invention spreads in a paste-like manner and becomes dense while covering the surface of the particles of the active material, the particles of the active material approach each other, and accordingly the conductive carbon of the present invention is pushed out not only into the gaps formed between the adjacent particles of the active material, but also into the pores that exist on the surface of the particles of the active material, and fills the gaps and pores while covering the surface of the particles of the active material. Therefore, the amount of the active material per unit volume in the electrode is increased and electrode density is increased. Moreover, the paste-like conductive carbon that is densely filled has sufficient conductivity to serve as a conductive agent and does not inhibit the impregnation of an electrolytic solution in the electric storage device. As a result, the energy density of the electric storage device is improved.

As the active material for a positive electrode and an active material for a negative electrode that are mixed with the conductive carbon of the present invention in the manufacture of an electrode material, an active material for an electrode that is used in a conventional electric storage device can be used without any specific restrictions. The active material can be a single chemical compound or a mixture of two or more kinds of chemical compound.

Examples of a positive electrode active material for a secondary battery are, among all, $LiMO_2$ having a laminar rock salt structure, laminar $Li_2MnO_3$—$LiMO_2$ solid solution, and spinel $LiM_2O_4$(M in the formula signifies Mn, Fe, Co, Ni or a combination thereof). Specific examples of these are $LiCoO_2$, $LiNiO_2$, $LiNi_{4/5}Co_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}Co_{1/3}Mn_{1/3}O_2$, $Li_2MnO_3$—$LiNi_{1/2}Mn_{1/2}O_2$, $Li_2MnO_3$—$LiNi_{1/2}Mn_{1/2}O_2$—$LiNi_{1/3}Co_{1/3}Mn_{1/3}O_2$, $LiMn_2O_4$ and $LiMn_{3/2}Ni_{1/2}O_4$. Other examples include sulfur and a sulfide such as $Li_2S$, $TiS_2$, $MoS_2$, $FeS_2$, $VS_2$ and $Cr_{1/2}V_{1/2}S_2$, a selenide such as $NbSe_3$, $VSe_2$ and $NbSe_3$, an oxide such as $Cr_2O_5$, $Cr_3O_8$, $VO_2$, $V_3O_8$, $V_2O_5$ and $V_6O_{13}$ as well as a complex oxide such as $LiNi_{0.8}Co_{0.15}Al_{0.05}O_2$, $LiVOPO_4$, $LiV_3O_5$, $LiV_3O_8$, $MoV_2O_8$, $Li_2FeSiO_4$, $Li_2MnSiO_4$, $LiFePO_4$, $LiFe_{1/2}Mn_{1/2}PO_4$, $LiMnPO_4$ and $Li_3V_2(PO_4)_3$.

Examples of a negative electrode active material for a secondary battery are an oxide such as $Fe_2O_3$, $MnO$, $MnO_2$, $Mn_2O_3$, $Mn_3O_4$, $CoO$, $Co_3O_4$, $NiO$, $Ni_2O_3$, $TiO$, $TiO_2$, $SnO$, $SnO_2$, $SiO_2$, $RuO_2$, $WO$, $WO_2$ and $ZnO$, metal such as Sn, Si, Al and Zn, a complex oxide such as $LiVO_2$, $Li_3VO_4$ and $Li_4Ti_5O_{12}$, and a nitride such as $Li_{2.6}Co_{0.4}N$, $Ge_3N_4$, $Zn_3N_2$ and $Cu_3N$.

As an active material in a polarizable electrode of an electric double layer capacitor, a carbon material with a large specific surface area such as activated carbon, carbon nanofiber, carbon nanotube, phenol resin carbide, polyvinylidene chloride carbide and microcrystal carbon is exemplified. In a hybrid capacitor, a positive electrode active material exemplified for a secondary battery can be used as a positive electrode. In this case, a negative electrode is composed of a polarizable electrode using activated carbon etc. Also, a negative electrode active material exemplified for a secondary battery can be used as a negative electrode. In this case, a positive electrode is composed of a polarizable electrode using activated carbon etc. As a positive electrode active material of a redox capacitor, a metal oxide such as $RuO_2$, $MnO_2$ and NiO is exemplified, and a negative electrode is composed of an active material such as $RuO_2$ and a polarizable material such as activated carbon.

There is no limitation to the shape or particle diameter of the particles of an active material, but it is preferable that the average particle diameter of the particles of the active material is within the range of 0.01 to 2 μm. The particles of the active material that have an average particle diameter within the range of 0.01 to 2 μm are easy to aggregate, but in the process to obtain an electrode material by mixing the particles of the active material with the conductive carbon of the present invention, the conductive carbon is attached to and covers the surface of the particles of the active material, so that aggregation of the particles of the active material can be inhibited even if the average particle diameter of the particles of the active material is small, and the mixing state of the particles of the active material and the conductive carbon can be uniformalized. Also, it is preferable that the average particle diameter of the particles of the active material is more than 2 μm and not more than 25 μm. The particles of the active material that have such a relatively large diameter improve electrode density, and in the process of mixing in manufacturing the electrode material, gelatinization of the conductive carbon is promoted by the compressing strength of the particles. Also, in the process of applying pressure to the active material layer on the current collector in manufacturing the electrode, the particles of an active material that have such a relatively large particle diameter further press the conductive carbon, at least a part of which is gelatinized, and make the carbon further spread in a paste-like manner, and make the carbon denser. As a result, electrode density further increases and the energy density of an electric storage device further improves.

Also, it is preferable that the particles of an active material are composed of fine particles with an average diameter of 0.01 to 2 µm and gross particles with an average diameter of more than 2 µm and not more than 25 µm that are operable as an active material of the same electrode as the fine particles. In the process of manufacturing an electrode material, the conductive carbon of the present invention is attached to and covers the surface not only of the fine particles, but also of the gross particles, so that aggregation of the particles of the active material can be inhibited, and the mixing state of the particles of the active material and the conductive carbon can be uniformalized. Also, as mentioned above, the gross particles promote gelatinization and densification of the conductive carbon of the present invention, increase electrode density, and improve the energy density of the electric storage device. Further, by the pressure applied by a rolling treatment to an active material layer that is formed on a current collector in manufacturing an electrode, the fine particles press the conductive carbon of the present invention and are pushed out into and fill the gaps that are formed between adjacent gross particles together with the conductive carbon which is spread in a paste-like manner, so that the electrode density further increases and the energy density of the electric storage device further improves.

Also, the conductive carbon of the present invention can be used concurrently with conductive carbon other than the conductive carbon of the present invention, including carbon black such as Ketjen Black, acetylene black, furnace black and channel black, fullerene, carbon nanotube, carbon nanofiber, graphene, amorphous carbon, carbon fiber, natural graphite, artificial graphite, graphitized Ketjen Black, mesoporous carbon, and vapor grown carbon fiber etc., which is used for an electrode of a conventional electric storage device. Especially, it is preferable to use concurrently carbon that has a higher electroconductivity than the electroconductivity of the conductive carbon of the present invention. Since the conductive carbon of the present invention is attached to and covers not only the surface of the active material particles, but also the surface of the conductive carbon used concurrently, the aggregation of the conductive carbon used concurrently can be inhibited. Moreover, by the pressure added to the active material layer formed on the current collector by a rolling treatment in manufacturing the electrode, the conductive carbon used concurrently densely fills the gap formed between the adjacent particles together with the conductive carbon of the present invention that is spread in a paste-like manner, and the electroconductivity of the entire electrode improves, and thus the energy density of the electric storage device further improves.

The method to mix the active material particles, the conductive carbon of the present invention and the other conductive carbon used concurrently as needed has no restrictions, and a heretofore known method of mixing can be used. However, it is preferable to mix by dry mixing, and for dry mixing a mashing machine, ball mill, bead mill, rod mill, roller mill, agitation mill, planetary mill, vibration mill, hybridizer, mechanochemical composite device and jet mill can be used. Especially, it is preferable to give a mechanochemical treatment to the active material particles and the conductive carbon of the present invention because the coatability and the evenness of the covering of the active material particles by the conductive carbon of the present invention are improved. The ratio of the amount of the active material particles and that of the conductive carbon of the present invention or the total amount of the conductive carbon of the present invention and the other conductive carbon used concurrently as needed is preferably within the range of 90:10 to 99.5:0.5 mass ratio and more preferably within the range of 95:5 to 99:1 in order to obtain an electric storage device with a high energy density. If the ratio of the conductive carbon is lower than the abovementioned range, the conductivity of the active material layer tends to become insufficient, and the covering rate of the active material particles by the conductive carbon tends to decrease. Also, if the ratio of the conductive carbon is larger than the abovementioned range, the electrode density tends to decrease and the energy density of the electric storage device tends to decrease.

As the current collector for an electrode of an electric storage device, an electroconductive material such as platinum, gold, nickel, aluminum, titanium, steel and carbon can be used. For the form of the current collector, any form such as a film, foil, plate, net, expanded metal, or cylinder can be adopted.

As the binder to be mixed with the electrode material, a heretofore known binder such as polytetrafluoroethylene, polyvinylidene fluoride, tetrafluoroethylene-hexafluoropropylene copolymer, polyvinyl fluoride and carboxymethylcellulose can be used. It is preferable that the amount of binder used is 1 to 30% by mass of the total amount of the mixed material. If the amount of binder used is 1% by mass or less, the strength of the active layer is not sufficient, and if the amount of binder used is 30% by mass or more, drawbacks such as a decrease in the discharge capacity of an electrode or excessive internal resistance arise. As the solvent to be mixed with the electrode material, a solvent such as N-methyl pyrrolidone that does not adversely affect the electrode material can be used without any restriction.

By measuring the pore distribution of the active material layer in the electrode that has the active material layer comprising the conductive carbon of the present invention by using the nitrogen gas adsorption method, it was found the active material layer has pores with a diameter of 5 to 40 nm. These tiny pores are considered to be pores within the dense, paste-like conductive carbon and these pores are of sufficiently large a size to allow an electrolytic solution in an electric storage device to go through the paste-like conductive carbon to the active material particles. Therefore, the paste-like conductive carbon in the active material layer does not inhibit the impregnation of the electrolytic solution in the electric storage device. Moreover, it was found that the dense, paste-like conductive carbon also exists in the gaps formed between the adjacent particles of the electrode active material and/or inside the pores that exist on the surface of the electrode active material, the gaps and the pores having a width of 50 nm or less. Therefore, the conductive property of the entire active material layer is improved and the electrode density is also improved. Conductive carbon such as carbon black, natural graphite and carbon nanotube, which are used as a conductive agent in an electrode of a conventional electric storage device, can hardly intrude into gaps or pores of such narrow width. The term "the width of the gaps formed between the adjacent particles of the electrode active material" means the shortest distance of the distances between adjacent particles of the electrode active material and the term "the width of the pores that exist on the surface of the electrode active material" means the shortest distance of the distances between the points at the opposite ends of the pores.

In the electrode that has the active material layer comprising the conductive carbon of the present invention, most or all of the surface of the particles of the active material in the active material layer are covered by the conductive carbon of the present invention that is dense and spreads in a paste-like manner to the inside of the pores that exist on the surface of the active material particle, and 80% or more of the surface (outer surface) of the particles of the active material, preferably 90% or more, and especially preferably 95% or more contacts the dense, paste-like conductive carbon. Probably because of this, dissolution of the active material in the electrolytic solution of the electric storage device is significantly inhibited if the electric storage device is composed of this electrode. Here, the solution quantity of the active material decreases by approximately 40% or more compared the case where an electrode is composed of a conventional conductive agent such as acetylene black and an active material particle. Moreover, due to the fact that solution of the active material is significantly inhibited, the cycling characteristics of the electric storage device are significantly improved. The coverage rate of the surface of the particles of the active material by the paste-like conductive carbon is a value calculated by observation of SEM images of the cross-sectional surface of the active material layer at a magnification of 25,000.

EXAMPLES

The present invention is explained in the following examples, though the present invention is not limited to the following examples.

(1) The First Manufacturing Method, the Evaluation of the Contained Amount of the Hydrophilic Part and Electrode Density

Example 1

Ketjen Black (trade name: EC300J, manufacturer: Ketjen Black International Co., with average primary particle diameter: 40 nm, the specific surface area of micropores with a diameter of 2 nm or less, derived from the measurement result by the MP method using the nitrogen adsorption method: 430 $m^2g^{-1}$) weighing 10 g was added to 300 mL of 60% nitric acid and then the fluid obtained was irradiated by an ultrasonic wave for 10 minutes, and then the fluid was filtered and the Ketjen Black was retrieved. The retrieved Ketjen Black was washed with water three times and then dried, so that oxidized Ketjen Black was obtained. Then, 0.5 g of the oxidized Ketjen Black obtained was mixed with 1.98 g $Fe(CH_3COO)_2$, 0.77 g $Li(CH_3COO)$, 1.10 g $C_6H_8O_7.H_2O$, 1.32 g $CH_3COOH$, 1.31 g $H_3PO_4$, and 120 mL distilled water, and the mixed fluid obtained was agitated by a stirrer for 1 hour, and then the mixed fluid was evaporated, dried and solidified at 100° C. in air and a mixture was collected. Then, the mixture obtained was introduced into a vibratory ball mill device and pulverization was conducted at 20 hz for 10 minutes. The powder obtained by pulverization was heated at 700° C. for 3 minutes in nitrogen, and a complex in which $LiFePO_4$ was supported by Ketjen Black was obtained.

1 g of the complex obtained was added to 100 mL of 30% hydrochloric acid aqueous solution, then the $LiFePO_4$ in the complex was dissolved by irradiating the fluid obtained with an ultrasonic wave for 15 minutes, and the remaining solid matter was filtered, washed with water and dried. A part of the solid matter after drying was heated to 900° C. in air and its weight loss was measured by TG analysis. Until it was confirmed that the weight loss was 100%, that is, no $LiFePO_4$ remained, the abovementioned process of dissolving $LiFePO_4$ in the hydrochloric acid aqueous solution, filtering, washing with water and drying was repeated, so that conductive carbon that did not contain any $LiFePO_4$ was obtained.

Then, 0.1 g of the conductive carbon obtained was added to 20 ml of ammonia solution with pH 11, and ultrasonic irradiation was conducted for 1 minute. The fluid obtained was left for 5 hours and a solid phase area was precipitated. After the precipitation of the solid phase area, the supernatant fluid was removed, the remaining part was dried, and the weight of the solid object after drying was measured. By subtracting the weight of the solid object after drying from the weight of the initial conductive carbon (0.1 g) and calculating the weight ratio of the subtracted result against the initial weight of the conductive carbon (0.1 g), the contained amount of the "hydrophilic part" in the conductive carbon was evaluated.

$Fe(CH_3COO)_2$, $Li(CH_3COO)$, $C_6H_8O_7.H_2O$, $CH_3COOH$ and $H_3PO_4$ were introduced into distilled water, and the compound fluid obtained was agitated by a stirrer for 1 hour, and then the compound fluid was evaporated, dried and solidified at 100° C. in air and then heated at 700° C. for 3 minutes in nitrogen, and $LiFePO_4$ fine particles with an initial particle diameter of 100 nm (the average particle diameter: 100 nm) were obtained. Then, commercially available $LiFePO_4$ gross particles (initial particle diameter: 0.5 to 1 μm, secondary particle diameter: 2 to 3 μm, the average particle diameter: 2.5 μm), the fine particles obtained and the abovementioned conductive carbon were mixed at the ratio of 90:9:1, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, dried and then given a rolling treatment, and an electrode with an active material layer was obtained. The electrode density of the electrode was calculated from the measured values of the volume and weight of the active material layer on the aluminum foil in the electrode.

Example 2

The procedure of Example 1 was repeated except that the process in which 0.5 g oxidized Ketjen Black, 1.98 g $Fe(CH_3COO)_2$, 0.77 g $Li(CH_3COO)$, 1.10 g $C_6H_8O_7.H_2O$, 1.32 g $CH_3COOH$, 1.31 g $H_3PO_4$ and 120 mL distilled water were mixed was changed into a process in which 1.8 g oxidized Ketjen Black, 0.5 g $Fe(CH_3COO)_2$, 0.19 g $Li(CH_3COO)$, 0.28 g $C_6H_8O_7.H_2O$, 0.33 g $CH_3COOH$, 0.33 g $H_3PO_4$ and 250 mL distilled water were mixed.

Example 3

10 g of Ketjen Black used in Example 1 was added to 300 mL of 40% nitric acid and then the fluid obtained was irradiated by an ultrasonic wave for 10 minutes, and then the fluid was filtered and the Ketjen Black was retrieved. The retrieved Ketjen Black was washed with water three times and then dried, so that oxidized Ketjen Black was obtained. Then, the procedure of Example 2 was repeated except that this oxidized Ketjen Black 1.8 g was used instead of the oxidized Ketjen Black 1.8 g used in Example 2.

Comparative Example 1

10 g of Ketjen Black used in Example 1 was added to 300 mL of 60% nitric acid and then the fluid obtained was irradiated by an ultrasonic wave for 1 hour, and then the fluid was filtered and the Ketjen Black was retrieved. The retrieved Ketjen Black was washed with water three times and then dried, so that oxidized Ketjen Black was obtained. This oxidized Ketjen Black was heated at 700° C. for 3 minutes in nitrogen. For the conductive carbon obtained, the contained amount of the hydrophilic part was measured by using the same procedure as the procedure in Example 1. Also, an electrode containing $LiFePO_4$ was produced by using the same procedure as the procedure in Example 1 and its electrode density was calculated.

Comparative Example 2

10 g of Ketjen Black used in Example 1 was added to 300 mL of 30% nitric acid and then the fluid obtained was irradiated by an ultrasonic wave for 10 minutes, and then the fluid was filtered and the Ketjen Black was retrieved. The retrieved Ketjen Black was washed with water three times and then dried, so that oxidized Ketjen Black was obtained. Then, without pulverization by vibratory ball mill, it was heated at 700° C. for 3 minutes in nitrogen. For the conductive carbon obtained, the contained amount of the hydrophilic part was measured by using the same procedure as the procedure in Example 1. Also, an electrode containing $LiFePO_4$ was produced by using the same procedure as the procedure in Example 1 and its electrode density was calculated.

Comparative Example 3

To confirm the contribution of the hydrophilic part to electrode density, 40 mg of the conductive carbon of Example 1 was added to 40 mL of pure water, ultrasonic irradiation was applied for 30 minutes to disperse the carbon in the pure water, then the dispersion was left for 30 minutes, after which the supernatant fluid was removed, then the remaining part was dried, and a solid object was obtained. For this solid object, the contained amount of the hydrophilic part was measured by using the same procedure as the procedure in Example 1. Also, using the conductive carbon obtained, an electrode containing $LiFePO_4$ was produced by using the same procedure as the procedure in Example 1 and its electrode density was calculated.

Comparative Example 4

For the Ketjen Black raw material used in Example 1, the contained amount of the hydrophilic part was measured by using the same procedure as the procedure in Example 1. Also, using the conductive carbon, an electrode containing $LiFePO_4$ was produced by using the same procedure as the procedure in Example 1 and its electrode density was calculated.

Figure 2:
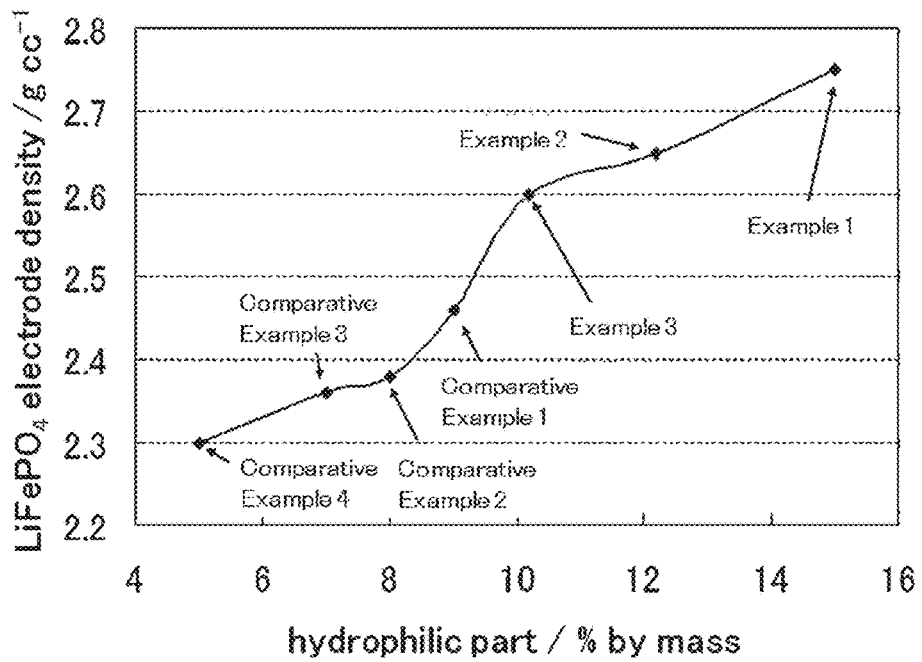
FIG. 2 shows a graph in which the relationship between the contained amount of a hydrophilic part and the electrode density is shown for conductive carbons of working examples and comparative examples.

FIG. 2 is a graph that shows the relationship between the contained amounts of the hydrophilic part in the conductive carbons of Examples 1 to 3 and Comparative Examples 1 to 4 and the electrode densities of electrodes of Examples 1 to 3 and Comparative Examples 1 to 4. As is evident from FIG. 2, if the contained amount of the hydrophilic part exceeds 8% by mass of the entire conductive carbon, the electrode density begins to increase, and if it exceeds 9% by mass of the entire conductive carbon, the electrode density begins to increase sharply, and if the contained amount of the hydrophilic part exceeds 10% by mass of the entire conductive carbon, the high electrode density of 2.6 g/cc or more can be obtained. Also, as is evident from the comparison of the result for Example 1 and the result for Comparative Example 3, the hydrophilic part of the conductive carbon largely contributes to the improvement of electrode density.

(2) The Second Manufacturing Method, the Evaluation of the Contained Amount of the Hydrophilic Part and Electrode Density Example 4

Ketjen Black (trade name: EC300J, manufacturer: Ketjen Black International Co., with average primary particle diameter: 40 nm, the specific surface area of micropores: 430 $m^2g^{-1}$) weighing 0.45 g was mixed with 4.98 g $Co(CH_3COO)_2.4H_2O$, 1.6 g $LiOH.H_2O$ and 120 mL distilled water, and the mixed fluid obtained was agitated by a stirrer for 1 hour, and then a mixture was collected by filtering. Then, 1.5 g $LiOH.H_2O$ was mixed through an evaporator and then heated at 250° C. for 30 minutes in air, and a complex in which a lithium cobalt chemical compound was supported by Ketjen Black was obtained. 1 g of the complex obtained was added to 100 mL aqueous solution in which concentrated sulfuric acid (98%), concentrated nitric acid (70%) and hydrochloric acid (30%) were mixed at the volume ratio of 1:1:1, and the lithium cobalt chemical compound in the complex was dissolved by irradiating the mixed fluid obtained with an ultrasonic wave for 15 minutes, and then the residual solid matter was filtered, washed with water and dried. A part of the solid matter after drying was heated to 900° C. in air and its weight loss was measured by TG analysis. Until it was confirmed that the weight loss was 100%, that is, no lithium cobalt chemical compound remained, the abovementioned process of dissolving the lithium cobalt chemical compound in the abovementioned acid aqueous solution, filtering, washing with water and drying was repeated, so that conductive carbon that did not contain any lithium cobalt chemical compound was obtained.

Then, for the conductive carbon obtained, the contained amount of the hydrophilic part was measured by using the same procedure as the procedure in Example 1. The contained amount of the hydrophilic part was 14.5% by mass of the entire carbon.

$Li_2CO_3$, $Co(CH_3COO)_2$ and $C_6H_8O_7.H_2O$ were introduced into distilled water, the compound fluid obtained was agitated by a stirrer for 1 hour, and then the compound fluid was evaporated, dried and solidified at 100° C. in air and was then heated at 800° C. in air for 10 minutes, and $LiCoO_2$ fine particles with an average diameter of 0.5 μm were obtained. Then, commercially available $LiCoO_2$ gross particles (average diameter: 10 μm), the fine particles obtained and the abovementioned conductive carbon were mixed at the mass ratio of 90:9:1, and 5% by mass of the total mass of polyvinylidene fluoride and an adequate quantity of N-methyl pyrrolidone were added and kneaded sufficiently so that slurry was formed, and this slurry was coated on an aluminum foil, dried and then given a rolling treatment, and an electrode with an active material layer was obtained. The electrode density of the electrode was calculated from the measured values of the volume and weight of the active material layer on the aluminum foil in the electrode. The value of the electrode density was 4.2 g/cc.

Comparative Example 5

For the Ketjen Black raw material used in Example 4, the contained amount of the hydrophilic part was measured by using the same procedure as the procedure in Example 1. The contained amount of the hydrophilic part was 5% by mass of the entire carbon. Also, an electrode containing $LiCoO_2$ was produced by using the same procedure as the procedure in Example 4 and its electrode density was calculated. The value of the electrode density was 3.6 g/cc.

Comparison of Example 4 and Comparative Example 5 revealed that the electrode density significantly improves if the contained amount of the hydrophilic part is 10% by mass or more of the entire conductive carbon.

(3) Evaluation as a Lithium Ion Secondary Battery
(i) Active Material: $LiNi_{0.5}Mn_{0.3}Co_{0.2}O_2$ Example 5

$Li_2CO_3$, $Ni(CH_3COO)_2$, $Mn(CH_3COO)_2$ and $Co(CH_3COO)_2$ were introduced into distilled water, the compound fluid obtained was agitated by a stirrer for 1 hour, and then the compound fluid was evaporated, dried and solidified at 100° C. in air, mixed by using a ball mill, and then heated at 800° C. in air for 10 minutes, and $LiNi_{0.5}Mn_{0.3}Co_{0.2}O_2$ fine particles with an average diameter of 0.5 μm were obtained. These fine particles and the conductive carbon in Example 1 were mixed at the ratio by mass of 90:10 and a preliminary compound was obtained. Then, 86% by mass of commercially available $LiNi_{0.5}Mn_{0.3}Co_{0.2}O_2$ gross particles (average diameter: 5 μm), 9% by mass of the abovementioned preliminary compound and 2% by mass of acetylene black (primary particle diameter: 40 nm, specific surface area of micropores: 0 $m^2g^{-1}$) were mixed, and then 3% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.00 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Example 6

94% by mass of commercially available $LiNi_{0.5}Mn_{0.3}Co_{0.2}O_2$ particles (average diameter: 5 μm), 2% by mass of the conductive carbon of Example 1 and 2% by mass of acetylene black (primary particle diameter: 40 nm, specific surface area of micropores: 0 $m^2g^{-1}$) were mixed, and then 2% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.81 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Comparative Example 6

94% by mass of commercially available $LiNi_{0.5}Mn_{0.3}Co_{0.2}O_2$ particles (average diameter: 5 μm) and 4% by mass of acetylene black (primary particle diameter: 40 nm, specific surface area of micropores: 0 $m^2g^{-1}$) were mixed, and then 2% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.40 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Figure 3:
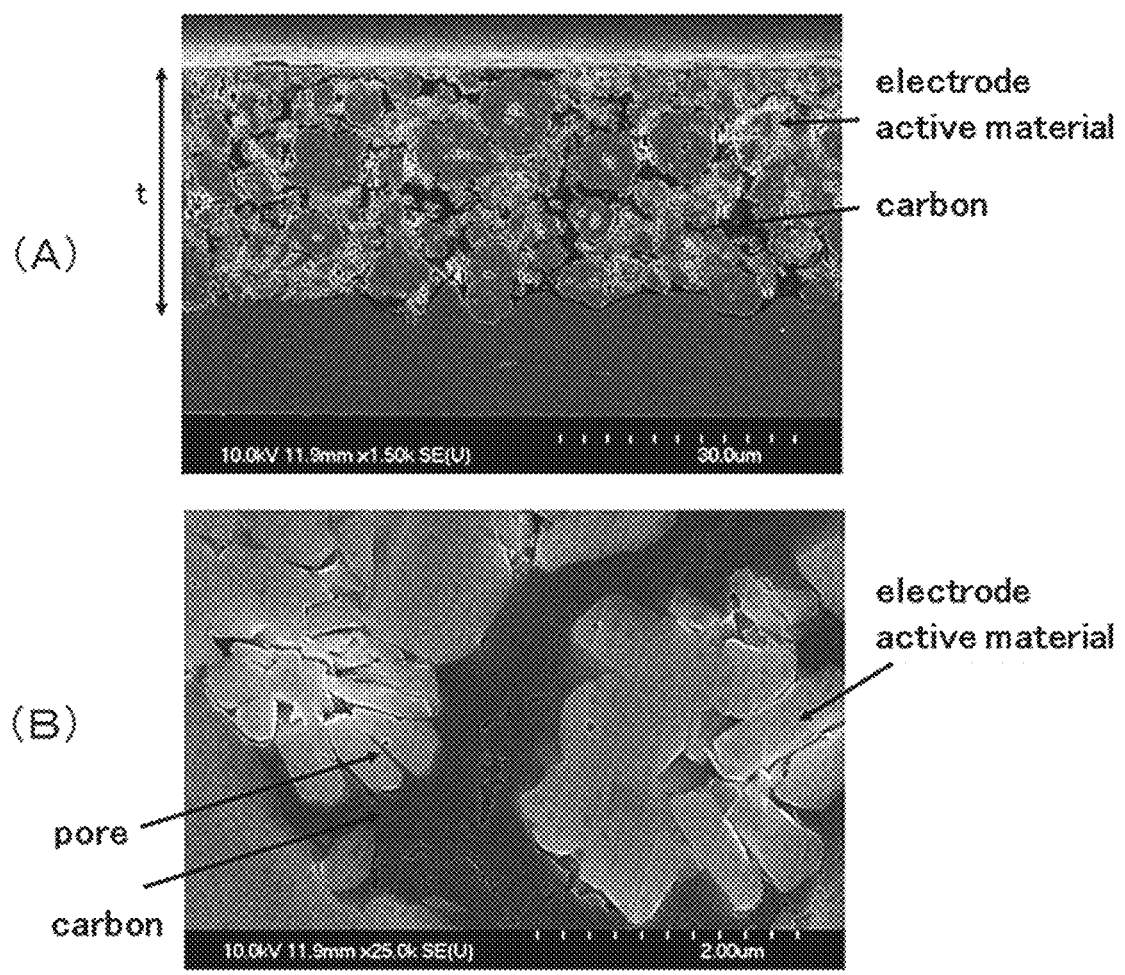
FIG. 3 shows SEM images of the cross-section of an electrode with an active material layer that comprises conductive carbon of a working example and particles of an active material: (A) at a magnification of 1,500 and (B) at a magnification of 25,000.
Figure 4:
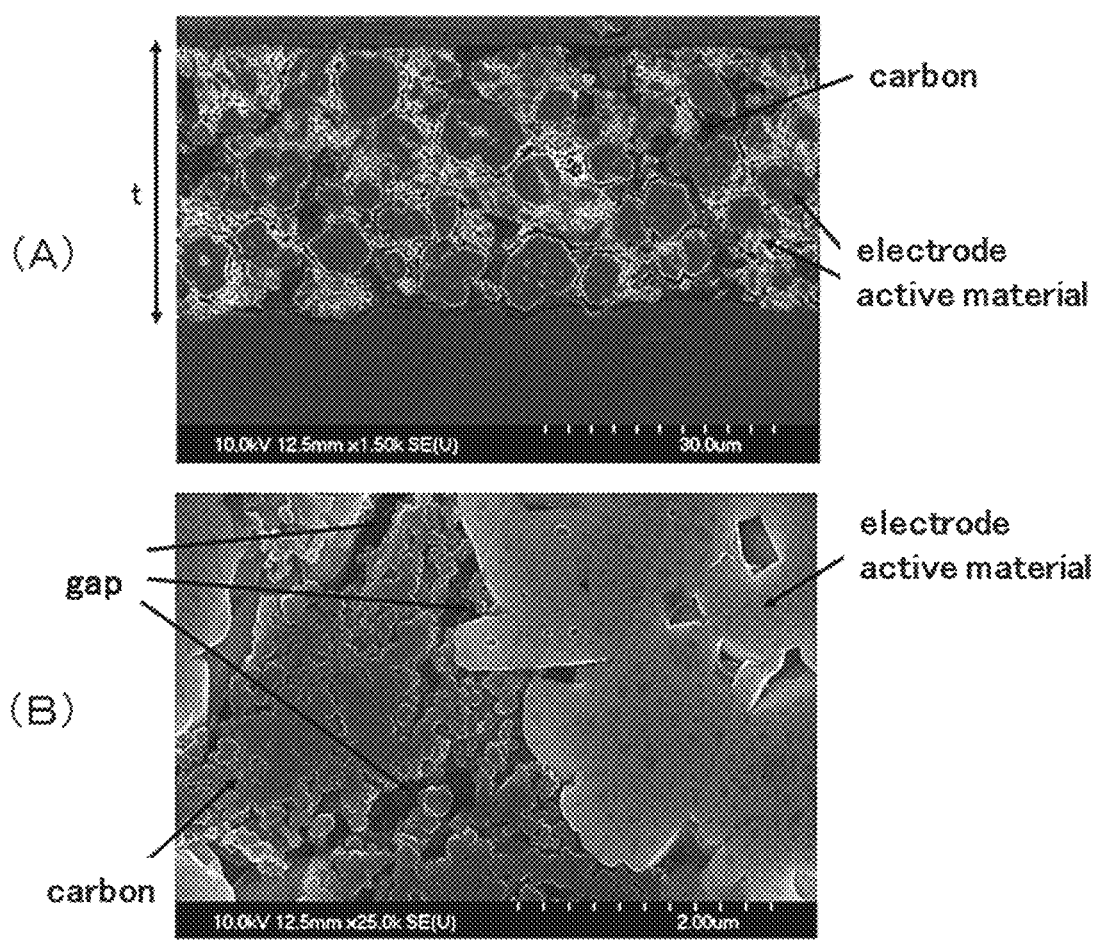
FIG. 4 shows SEM images of the cross-section of an electrode with an active material layer that comprises conductive carbon of a comparative example and particles of an active material: (A) at a magnification of 1,500 and (B) at a magnification of 25,000.

FIG. 3 shows SEM images of the cross-section of the positive electrode of the lithium ion secondary battery of Example 6 and FIG. 4 shows SEM images of the cross-section of the positive electrode of the lithium ion secondary battery of Comparative Example 6. In both figures, (A) is an image at a magnification of 1,500 and (B) is an image at a magnification of 25,000. In FIG. 3(A) and FIG. 4(A), the thickness of the active material layer is shown as t. It can be seen that the active material layer in the lithium ion secondary battery of Example 6 is thinner than the active material layer in the lithium ion secondary battery of Comparative Example 6, even though the contained amount of the particles of the active material and the contained amount of carbon in the active material layer are the same. Also, from the comparison of FIG. 3(A) and FIG. 4(A), it was found that, in the active material layer of the lithium ion secondary battery of Example 6, the particles of the active material approach each other and the ratio of the area occupied by carbon to the area of the entire active material layer in the image is small. Further, the forms of carbon in FIG. 3(B) and FIG. 4(B) are remarkably different. In the active material layer of the lithium ion secondary battery of Comparative Example 6 (FIG. 4(B)), the grain boundaries of carbon (acetylene black) primary particles are clear and there are large gaps adjacent to the surface boundary between the particles of the active material and the carbon particles, especially adjacent to the pores formed on the surface of the particles of the active material, in addition to the gaps between the carbon particles, whereas in the active material layer of the lithium ion secondary battery of Example 6 (FIG. 3(B)), the grain boundaries of carbon primary particles are not discernible, the carbon is paste-like and this paste-like carbon intrudes into the deep parts of the pores of the particles of the active material that have a width of 50 nm or less (ie. gaps between the primary particles), and gaps are virtually absent. Moreover, it is shown that 90% or more of the surface of the particles of the active material contact the paste-like carbon. It is assured that the difference between the electrode densities in the positive electrodes of the lithium ion secondary batteries in Example 6 and Comparative Example 6 is derived from the above-described difference in the forms of carbon.

As mentioned above, because the active material layer in Example 6 is thinner than the active material layer in Comparative Example 6, it is assured that the material filling rate in the former is large, and the material filling rate was confirmed in the following formulae. The theoretical electrode density refers to the electrode density when gaps in the active material layer are assumed to be 0%.

Material filling rate (%)=electrode density×100/theoretical electrode density    (I)

Theoretical electrode density (g/cc)=100/{$a/X+b/Y+(100-a-b)/Z$}    (II)

where:

a: % by mass of the active material against the entire active material layer b: % by mass of carbon against the entire active material layer 100−a−b: % by mass of polyvinylidene fluoride against the entire active material layer X: true density of the active material Y: true density of carbon black Z: true density of polyvinylidene fluoride As a result, the material filling rate of the active material layer in Example 6 was 86.8% and the material filling rate of the active material layer in Comparative Example 6 was 79.1%; in the electrode containing the conductive carbon of the present invention, an improvement in the filling rate of as much as 7.7% was observed.

Figure 5:
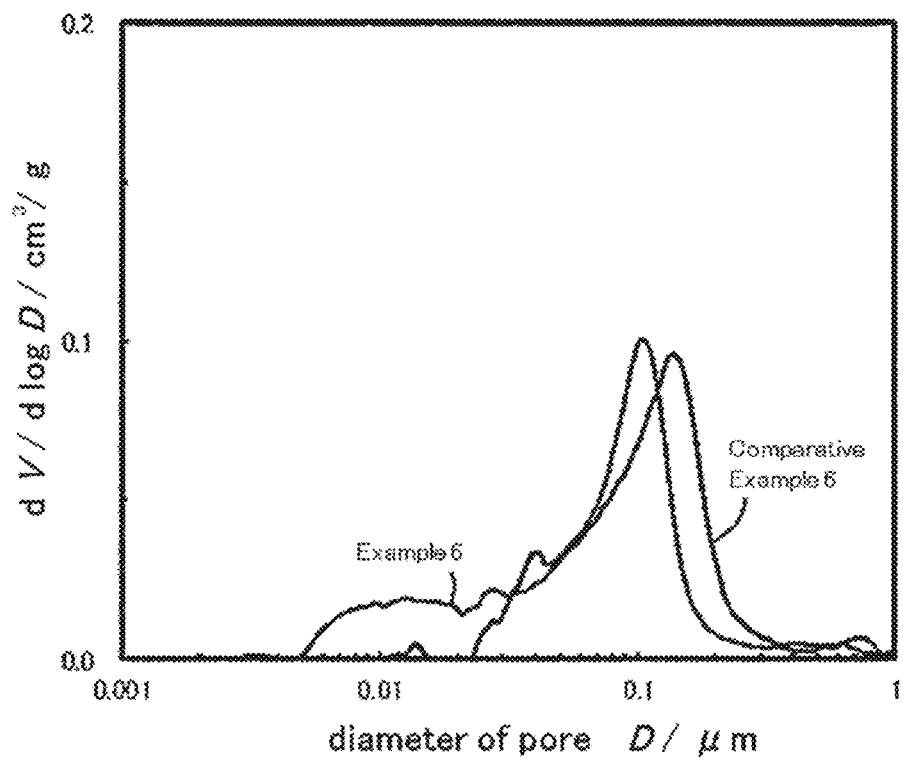
FIG. 5 shows a graph that shows the result of measuring the distribution of pores in electrodes shown in FIGS. 3 and 4 by the nitrogen gas adsorption method.

FIG. 5 shows the result of the measurement of the pore distribution in the active material layer of Example 6 and the active material layer of Comparative Example 6 by the nitrogen gas adsorption method. The result shows that, in the active material layer in Comparative Example 6, pores with a diameter of 20 nm or less are virtually absent, and most of the pores show peaks at the diameter of approximately 30 nm, the diameter of approximately 40 nm, and the diameter of approximately 150 nm. Presumably, the pores that show a peak at the diameter of approximately 150 nm are pores that are mainly attributable to the particles of an active material and the pores that show peaks at the diameter of approximately 30 nm and the diameter of approximately 40 nm are the pores that are mainly found between particles of acetylene black. On the other hand, it is assured that, in the active material layer in Example 6, the number of pores with a diameter of approximately 100 nm or more among the pores in the active material layer in Comparative Example 6 is decreased, and instead the number of pores with a diameter within the range of 5 to 40 nm is increased. It is considered that the decrease in the number of pores with a diameter of approximately 100 nm or more is because the pores of the particles of the active material are covered with the paste-like conductive carbon. Moreover, the pores with a diameter within the range of 5 to 40 nm, which are presumably pores in the dense, paste-like conductive carbon, are of a sufficiently large size to allow for the electrolytic solution in an electric storage device to go through the paste-like conductive carbon to contact the active material particles. Therefore, it is concluded that the paste-like conductive carbon in the electrode does not inhibit the impregnation of the electrolytic solution in the electric storage device.

Figure 6:
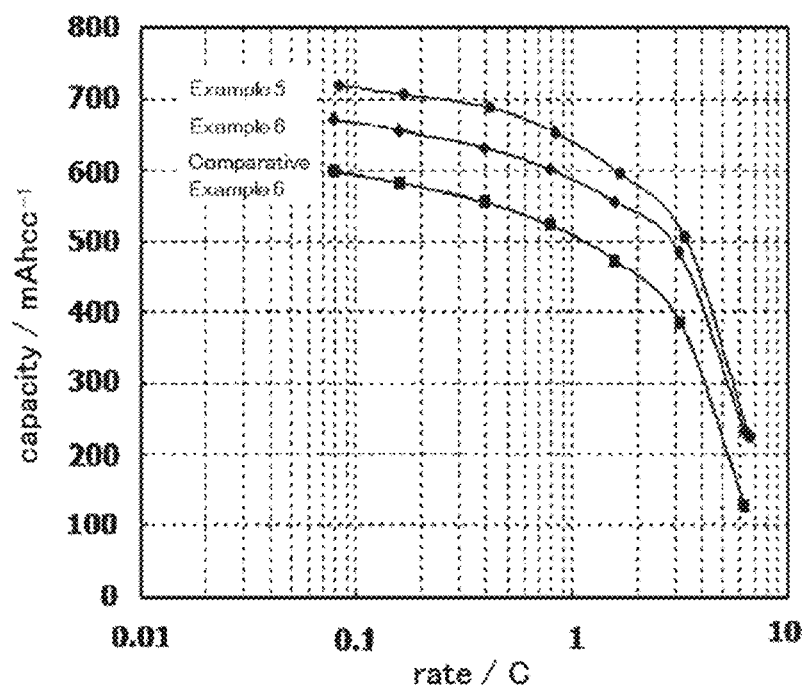
FIG. 6 shows the rate characteristics of a lithium ion secondary battery that has an electrode with an active material layer that comprises conductive carbon of a working example or a comparative example and particles of an active material.

FIG. 6 is a graph that shows the relationship between the rate and the discharge capacity per volume of the positive electrode active material layer in the lithium ion secondary batteries of Example 5, Example 6 and Comparative Example 6. The lithium ion secondary battery of Example 6 shows a higher capacity than the lithium ion secondary battery of Comparative Example 6, and the lithium ion secondary battery of Example 5 shows a higher capacity than the lithium ion secondary battery of Example 6. That is, as the electrode density of the positive electrode increases, the discharge capacity per volume also increases. Also, these secondary batteries show almost the same rate characteristics. This reveals that the paste-like conductive carbons contained in the active material layers in the secondary batteries of Example 5 and Example 6 have sufficient electroconductivity to serve as a conductive agent and do not inhibit the impregnation of the electrolytic solution in a secondary battery. Also, the positive electrode of the secondary battery in Example 5 shows a higher electrode density than the positive electrode of the secondary battery in Example 6, even though the contained amount of the particles of the active material and the contained amount of carbon in the active material layer are almost the same, which is presumably because the fine particles are pushed out into and fill the gaps formed between the adjacent gross particles together with the conductive carbon of Example 1 while pressing the conductive carbon.

Figure 7:
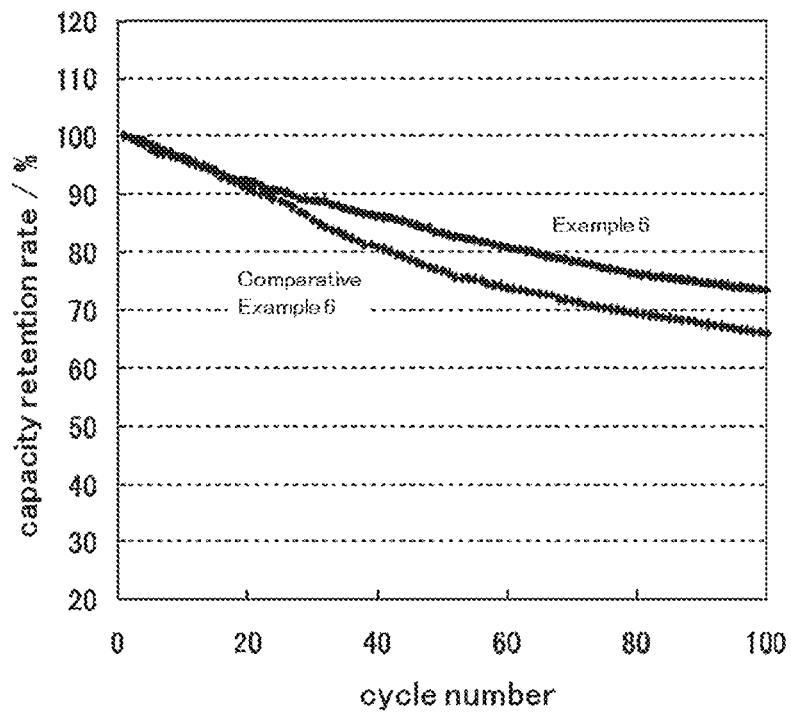
FIG. 7 shows a graph that shows the cycle characteristics of a lithium ion secondary battery, the rate characteristics of which are shown in FIG. 6.

For the lithium secondary batteries of Example 6 and Comparative Example 6, charging/discharging was repeated within the range of 4.6 to 3.0 V under the condition of 60° C. and the charging/discharging rate of 0.5 C. FIG. 7 shows the result of the cycling characteristics obtained. The result shows that the secondary battery of Example 6 has better cycle characteristics than the secondary battery of Comparative Example 6. From a comparison of FIG. 3 and FIG. 4, it is considered that this is because almost all of the surface of the particles of the active material in the active material layer in Example 6 is covered with paste-like carbon up to the point of the depth of the pores on the surface of the particles of the active material and that this paste-like carbon inhibits the degradation of the active material.

(ii) Active Material: LiCoO$_2$

Example 7

Li$_2$CO$_3$, Co(CH$_3$COO)$_2$ and C$_6$H$_8$O$_7$.H$_2$O were introduced into distilled water, the compound fluid obtained was agitated by a stirrer for 1 hour, and then the compound fluid was evaporated, dried and solidified at 100° C. in air and was then heated at 800° C. in air for 10 minutes, and LiCoO$_2$ fine particles with an average diameter of 0.5 μm were obtained. These particles and the conductive carbon obtained in Example 1 were mixed at the mass ratio of 90:10, and a preliminary mixture was obtained. Then, 86% by mass of the total mass of commercially available LiCoO$_2$ gross particles (average particle diameter: 10 μm), 9% by mass of the abovementioned preliminary mixture and 2% by mass of acetylene black (primary particle diameter: 40 nm, specific surface area of micropores: 0 m²g⁻¹) were mixed, and then 3% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.25 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Example 8

94% by mass of commercially available $LiCoO_2$ particles (average diameter: 10 μm), 2% by mass of the conductive carbon of Example 1 and 2% by mass of acetylene black (primary particle diameter: 40 nm, specific surface area of micropores: 0 m²g⁻¹) were mixed, and then 2% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.05 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Comparative Example 7

94% by mass of commercially available $LiCoO_2$ particles (average diameter: 10 μm) and 4% by mass of acetylene black (primary particle diameter: 40 nm, specific surface area of micropores: 0 m²g⁻¹) were mixed, and then 2% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.60 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

For the active material layer in Example 8 and the active material layer in Comparative Example 7, the material filling rates were confirmed by using the abovementioned formulae (I) and (II). As a result, the material filling rate of the active material layer in Example 8 was 85.6% and the material filling rate of the active material layer in Comparative Example 7 was 79.1%; in the electrode containing the conductive carbon of the present invention, an improvement in the filling rate of as much as 6.5% was observed.

Figure 8:
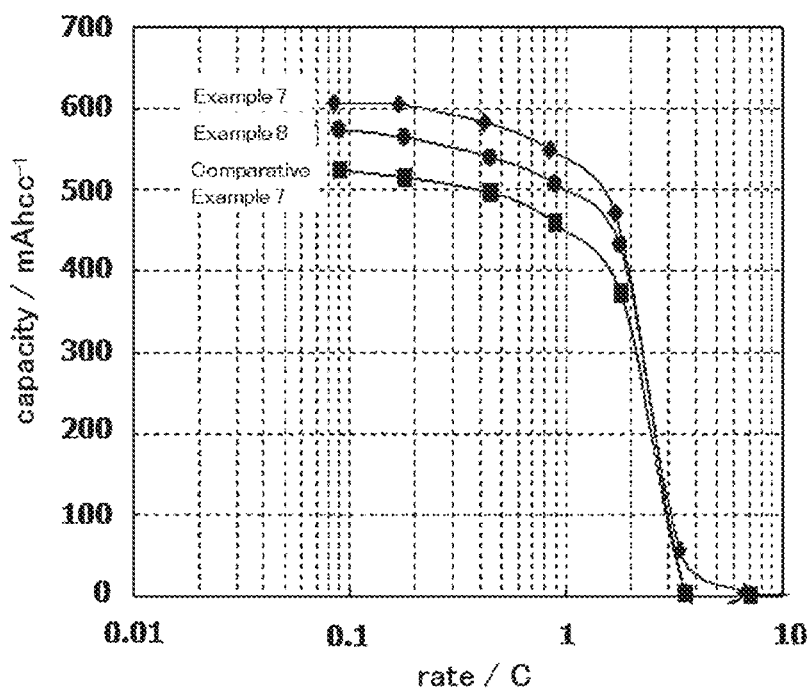
FIG. 8 shows the rate characteristics of a lithium ion secondary battery that has an electrode with an active material layer that comprises conductive carbon of a working example or a comparative example and particles of another kind of active material.
Figure 9:
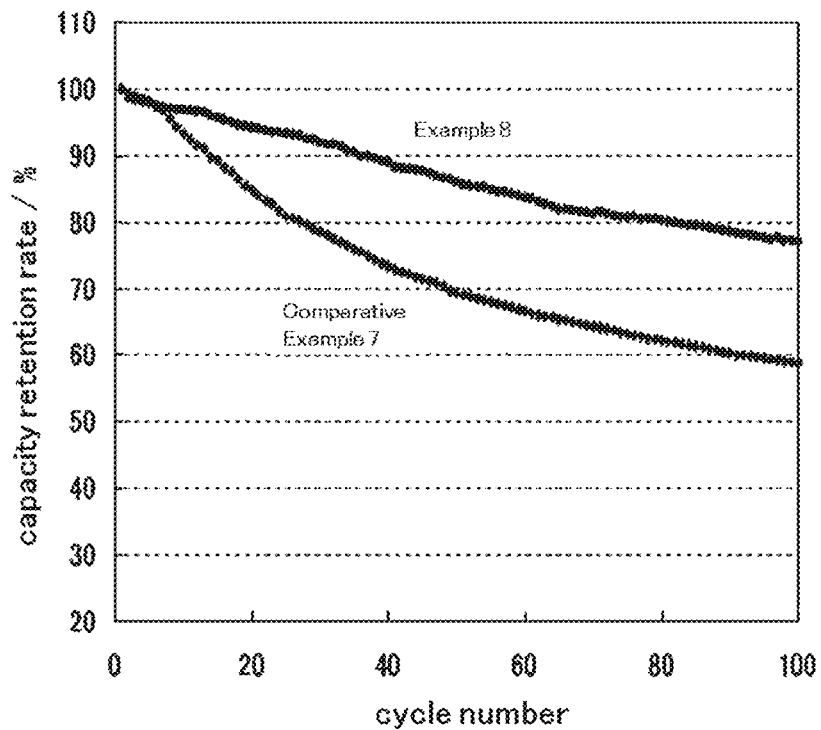
FIG. 9 shows a graph that shows the cycle characteristics of a lithium ion secondary battery, the rate characteristics of which are shown in FIG. 8.

FIG. 8 is a graph that shows the relationship between the rate and the discharge capacity per volume of the positive electrode active material layer in the lithium ion secondary batteries of Example 7, Example 8 and Comparative Example 7. In line with the result shown in FIG. 6, FIG. 8 shows that the discharging capacity increases as the electrode density increases and almost the same rate characteristics are obtained. For the lithium ion secondary batteries of Example 8 and Comparative Example 7, charging/discharging was repeated within the range of 4.3 to 3.0 V under the condition of 60° C. and the charging/discharging rate of 0.5 C. FIG. 9 shows the result of the cycling characteristics obtained. In line with the result shown in FIG. 7, FIG. 9 shows that the secondary battery of Example 8 has better cycle characteristics than the secondary battery of Comparative Example 7.

(iii) Active Material: $Li_{1.2}Mn_{0.56}Ni_{0.17}Co_{0.07}O_2$

Example 9

1.66 g $Li(CH_3COO)$, 2.75 g $Mn(CH_3COO)_2.4H_2O$, 0.85 g $Ni(CH_3COO)_2.4H_2O$, 0.35 g $Co(CH_3COO)_2.4H_2O$ and 200 mL distilled water were mixed, solvent was removed by using the evaporator, and a mixture was collected. Then, the mixture collected was introduced into a vibratory ball mill device, pulverization at 15 hz was conducted for 10 minutes, and an even mixture was obtained. The mixture after pulverization was heated at 900° C. in air for 1 hour and crystals of a lithium excess solid solution $Li_{1.2}Mn_{0.56}Ni_{0.17}Co_{0.07}O_2$ with an average particle diameter of 1 μm or less was obtained. 91% by mass of these crystal particles and 4% by mass of the conductive carbon of Example 1 were mixed, and then 5% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.15 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Comparative Example 8

91% by mass of $Li_{1.2}Mn_{0.56}Ni_{0.17}Co_{0.07}O_2$ particles that were obtained in Example 9 and 4% by mass of acetylene black (primary particle diameter: 40 nm, specific surface area of micropores: 0 m²g⁻¹) were mixed, and then 5% by mass of polyvinylidene fluoride and an adequate quantity of N-methyl pyrrolidone were added and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 2.95 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Figure 10:
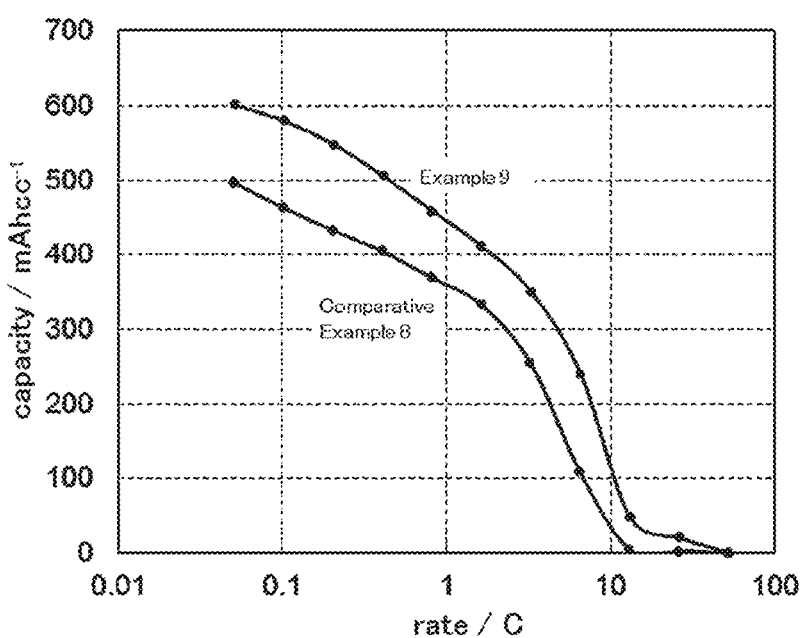
FIG. 10 shows the rate characteristics of a lithium ion secondary battery that has an electrode with an active material layer that comprises conductive carbon of a working example or a comparative example and particles of another kind of active material.
Figure 11:
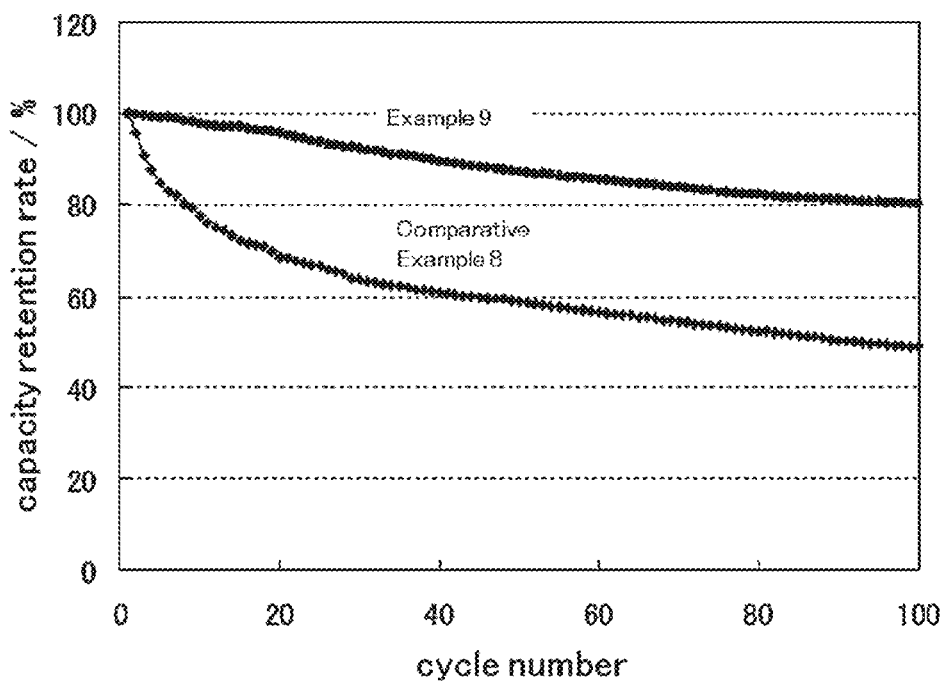
FIG. 11 shows a graph that shows the cycle characteristics of a lithium ion secondary battery, the rate characteristics of which are shown in FIG. 10.

FIG. 10 is a graph that shows the relationship between the rate and the discharge capacity per volume of the positive electrode active material layer in the lithium ion secondary batteries of Example 9 and Comparative Example 8. In line with the result shown in FIG. 6, FIG. 10 shows that the discharging capacity increases as the electrode density increases and almost the same rate characteristics are obtained. For the lithium ion secondary batteries of Example 9 and Comparative Example 8, charging/discharging was repeated within the range of 4.8 to 2.5 V under the condition of 25° C. and the charging/discharging rate of 0.5 C. FIG. 11 shows the result of the cycling characteristics obtained. As with the result shown in FIG. 7, FIG. 11 shows that the secondary battery of Example 9 has better cycle characteristics than the secondary battery of Comparative Example 8.

(iv) Change of Carbon Raw Material

Example 10

10 g of furnace black with pores (average primary particle diameter: 20 nm, specific surface area of micropores: 1131 $m^2g^{-1}$) was added to 300 mL of 60% nitric acid, an ultrasonic wave was irradiated for 10 minutes into the fluid obtained, and the fluid was filtrated and the furnace black was retrieved. The retrieved furnace black was washed with water three times and then dried, so that oxidized furnace black was obtained. 0.5 g of this oxidized furnace black, 1.98 g $Fe(CH_3COO)$, 0.77 g $Li(CH_3COO)$, 1.10 g $C_6H_8O_7.H_2O$, 1.32 g $CH_3COOH$, 1.31 g $H_3PO_4$, and 120 mL distilled water were mixed. The compound fluid obtained was agitated for 1 hour by a stirrer, and then the compound fluid was evaporated, dried and solidified at 100° C. in air, and a mixture was collected. Then, the mixture obtained was introduced into a vibratory ball mill device and pulverization was conducted at 20 hz for 10 minutes. The powder after pulverization was heated at 700° C. for 3 minutes in nitrogen, and a complex in which $LiFePO_4$ was supported by the furnace black was obtained.

1 g of the complex obtained was added to 100 mL of 30% hydrochloric acid solution, and $LiFePO_4$ in the complex was dissolved while the fluid obtained was irradiated by an ultrasonic wave for 15 minutes, and then the remaining solid body was filtered, washed by water, and dried. A part of the solid body after drying was heated to 900° C. in air and weight loss was measured by TG analysis. The process of dissolution of $LiFePO_4$ by the aforementioned hydrochloric acid solution, filtration, water washing and drying was repeated until it was confirmed that weight loss was 100%, that is, no $LiFePO_4$ remained, so that conductive carbon that did not contain any $LiFePO_4$ was obtained.

Then, 0.1 g of the conductive carbon obtained was added to 20 mL of ammonia solution with pH 11, and ultrasonic irradiation was applied for 1 minute. The fluid obtained was left for 5 hours and a solid phase area was precipitated. After the precipitation of the solid phase area, the supernatant fluid was removed, the remaining part was dried, and the weight of the solid object after drying was measured. By subtracting the weight of the solid object after drying from the weight of the initial conductive carbon (0.1 g) and calculating the weight ratio of the subtracted result against the initial weight of the conductive carbon (0.1 g), the contained amount of the "hydrophilic part" in the conductive carbon was evaluated. This conductive carbon contained 13% of hydrophilic part. The contained amount of the hydrophilic part in furnace black with pores, which was used as a raw material, was only 2%.

Figure 12:
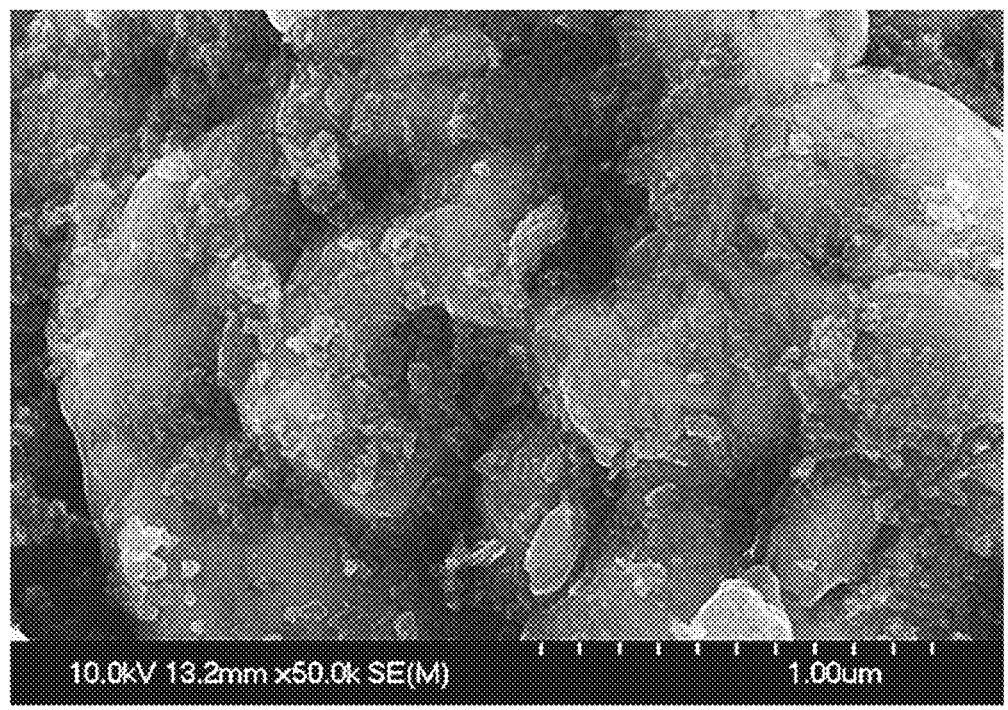
FIG. 12 shows an SEM image at a magnification of 50,000 of a mixture that is obtained by dry blending of conductive carbon of a working example, acetylene black and particles of an active material.

94% by mass of commercially available $LiNi_{0.5}Mn_{0.3}Co_{0.2}O_2$ particles (average diameter: 5 μm), 2% by mass of conductive carbon obtained, and 2% by mass of acetylene black (primary particle diameter: 40 nm, specific surface area of micropores: 0 $m^2g^{-1}$) were mixed. FIG. 12 shows an SEM image of the mixture obtained at a magnification of 50,000. The surface of the particles is partly covered with a paste-like material and their outline form is not clearly identifiable; this paste-like material is the conductive carbon that is obtained by oxidizing the furnace black raw material, which spreads while covering the surface of the particles due to the pressure during mixing. Also, it can be observed that fine furnace black with an average primary particle diameter 20 nm and acetylene black with an average primary particle diameter 40 nm are well dispersed. It is generally said that fine particles easily aggregate, but by virtue of the conductive carbon obtained by oxidizing furnace black with pores, aggregation of fine particles is effectively inhibited.

Then, 2% by mass of the total mass of polyvinylidene fluoride and an adequate quantity of N-methyl pyrrolidone were added to the mixture obtained and kneaded sufficiently so that slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.80 g/cc. Further, using the positive electrode obtained, a lithium ion secondary battery was manufactured in which a solution of 1M $LiPF_6$ in a 1:1 ethylene carbonate/diethyl carbonate solution was used as an electrolytic solution, and in which lithium was used as a counter electrode. For the battery obtained, charging/discharging characteristics were evaluated for a broad range of current densities. Also, charging/discharging was repeated within the range of 4.6 to 3.0 V under the condition of 60° C. and the charging/discharging rate of 0.5 C.

Example 10 and Comparative Example 6 are different in terms of the kind of carbon used for a positive electrode, but otherwise the same. In Example 10, conductive carbon obtained from a furnace black raw material with pores and acetylene black were used, whereas in Comparative Example 6, only acetylene black was used. The electrode density of the positive electrode in Comparative Example 6 was 3.40 g/cc, so the electrode density was significantly improved by using conductive carbon obtained from a furnace black raw material with pores. Example 10 and Example 6 are also different in terms of the kind of carbon used for a positive electrode, but otherwise the same. In Example 6, conductive carbon that was obtained from a Ketjen Black raw material and acetylene black were used, whereas in Example 10, conductive carbon obtained from a furnace black raw material with pores and acetylene black were used. The electrode density of the positive electrode in Example 6 was 3.81 g/cc, so almost the same electrode density was obtained notwithstanding the difference in the raw materials in the conductive carbon.

Figure 13:
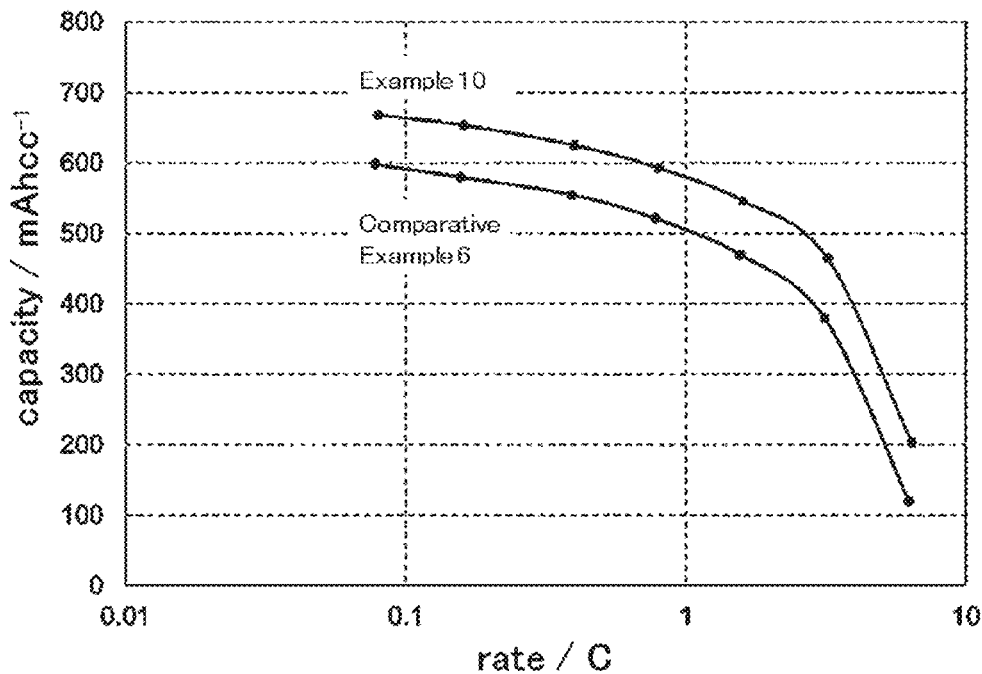
FIG. 13 shows the rate characteristics of a lithium ion secondary battery that has an electrode with an active material layer that comprises conductive carbon of a working example or a comparative example and particles of an active material.
Figure 14:
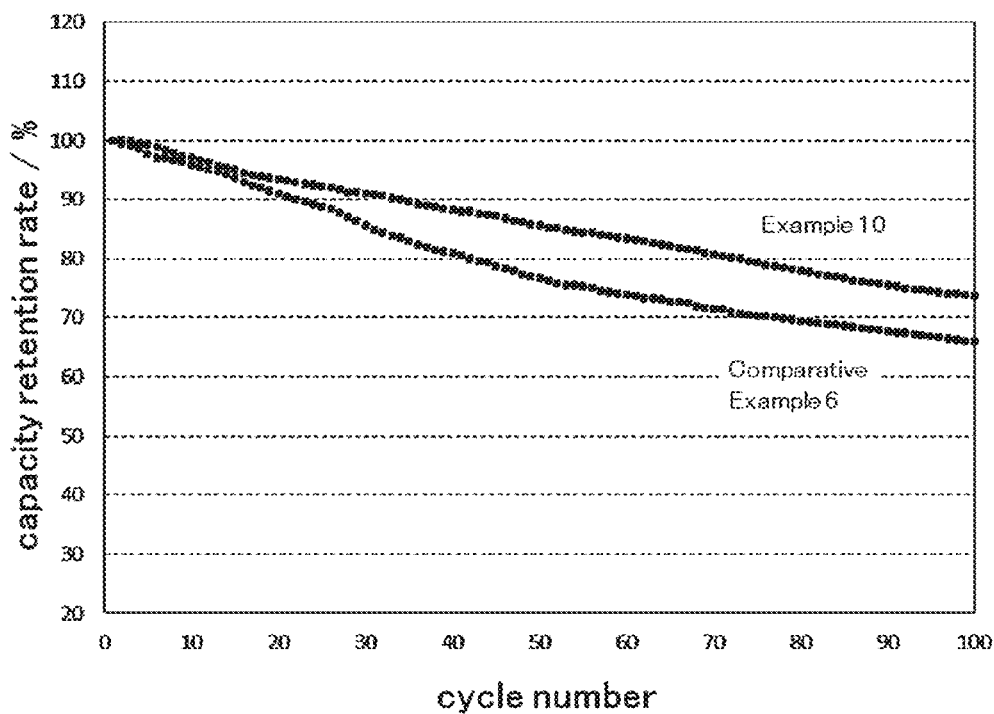
FIG. 14 shows a graph that shows the cycle characteristics of a lithium ion secondary battery, the rate characteristics of which are shown in FIG. 13.

FIG. 13 shows the relationship between the rate and the discharge capacity per volume of the positive electrode active material layer of the lithium ion secondary batteries in Example 10 and Comparative Example 6, and FIG. 14

1,000 ppm water was added to a solution of 1M $LiPF_6$ in a 1:1 ethylene carbonate/diethyl carbonate solution, a coin-type battery was manufactured. In this test, fine particles with a large specific surface area were used in order to increase the area of the active material that contacts the electrolytic solution. Also, 1000 ppm water was added for the purpose of conducting an accelerated test because an active material dissolves more easily when there is more water. This battery was left for 1 week at 60° C., then it was disintegrated, and then the electrolyte was collected and the amount of metal dissolved in the electrolyte was analyzed by using an ICP emission analysis device. Table 1 shows the result obtained.

TABLE 1

|  | amount of dissolution of active material/% | | | | decrease ratio |
| --- | --- | --- | --- | --- | --- |
|  | Mn | Fe | Co | Ni | (against acetylene black) |
| $LiFePO_4$ + acetylene black |  | 1.52 |  |  |  |
| $LiFePO_4$ + carbon in Example 1 |  | 0.93 |  |  | −39% |
| $LiCoO_2$ + acetylene black |  |  | 13.1 |  |  |
| $LiCoO_2$ + carbon in Example 1 |  |  | 6.05 |  | −54% |
| $LiNi_{0.5}Mn_{0.3}Co_{0.2}O_2$ + acetylene black | 4.5 |  | 1.59 | 1.32 |  |
| $LiNi_{0.5}Mn_{0.3}Co_{0.2}O_2$ + carbon in Example 1 | 1.9 |  | 1.35 | 0.93 | −44% | shows the result of the cycling characteristics of the lithium ion secondary batteries in Example 10 and Comparative Example 6. FIG. 13 shows that the discharge capacity increases as the electrode density increases and almost the same rate characteristics are obtained. Also, comparison of the rate characteristics of the secondary battery of Example 6 in FIG. 6 and the rate characteristics of the secondary battery of Example 10 in FIG. 13 reveals that almost the same rate characteristics are obtained notwithstanding the difference in the raw materials in the conductive carbon used for the positive electrodes. FIG. 14 shows that the secondary battery of Example 10 has better characteristics than the secondary battery of Comparative Example 6. Also, comparison of the cycling characteristics of the secondary battery of Example 6 in FIG. 7 and the cycling characteristics of the secondary battery of Example 10 in FIG. 14 reveals that almost the same rate characteristics can be obtained notwithstanding the difference in the raw materials in the conductive carbon used for the positive electrodes.

(4) Solubility of Active Material

As mentioned above, it is considered that the excellent cycle characteristics of the lithium ion secondary battery with a positive electrode that has an active material layer containing the conductive carbon of the present invention is because almost all the surface of the particles of the active material is covered with the paste-like carbon and this paste-like carbon inhibits the degradation of the active material. To confirm this, the solubility of the active material was investigated.

Each of the conductive carbon in Example 1 and acetylene black was mixed with $LiFePO_4$ particles with an average diameter of 0.22 μm, $LiCoO_2$ particles with an average diameter of 0.26 μm, and $LiNi_{0.5}Mn_{0.3}Co_{0.2}O_2$ with an average diameter of 0.32 μm at the ratio by mass of 5:95, and then 5% by mass of the total mass of polyvinylidene fluoride and an adequate quantity of N-methyl pyrrolidone were added and kneaded sufficiently so that slurry was formed, and this slurry was coated on an aluminum foil, dried and then given a rolling treatment, and an electrode was obtained. By using this electrode and an electrolyte in which As is evident from Table 1, the conductive carbon of Example 1 remarkably inhibits the dissolution of the active material into the electrolyte, compared with acetylene black. This is conceivably because the conductive carbon of Example 1, even if its active material is fine particles with an average particle diameter of 0.22 to 0.32 μm, effectively inhibits the aggregation of these fine particles and covers almost all the surface of the particles of the active material.

(5) Effect of Applying Pressure to Conductive Carbon (i) SEM Observation

Figure 15:
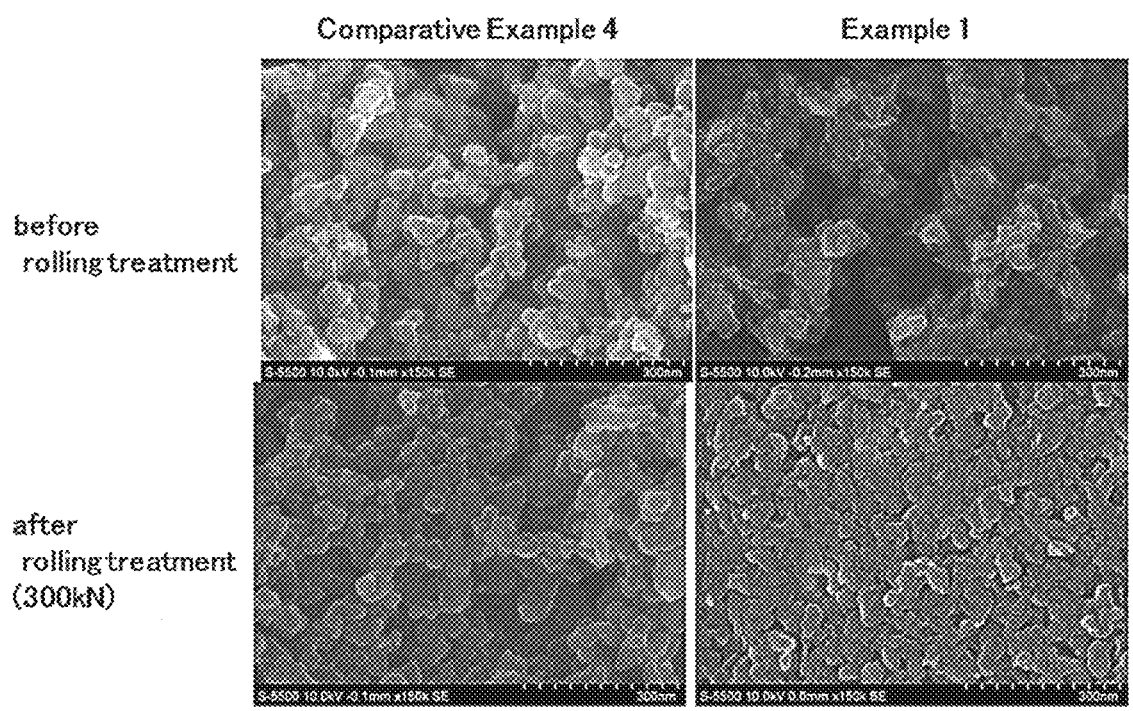
FIG. 15 shows SEM images of conductive carbons of a working example and a comparative example.

FIG. 15 shows SEM images of the coating films made by using the conductive carbon of Example 1 and the conductive carbon of Comparative Example 4, in which each was dispersed in a dispersion medium, and a dispersion obtained was coated on an aluminum foil and dried, and SEM images of the coating films after a rolling treatment with the force of 300 kN was given to the coating films. The coating film made with the conductive carbon of Comparative Example 4 did not exhibit a significant change before and after the rolling treatment. However, from the SEM images of the coating film made with the conductive carbon of Example 1, it was observed that the asperity of the surface was remarkably decreased by the rolling treatment, the carbon particles were spread and the grain boundaries were hardly discernable. Therefore, it was found that the characteristics of the carbon changed significantly due to the application of a strong oxidizing treatment.

(ii) Relationship Between Pressure and Density

Figure 16:
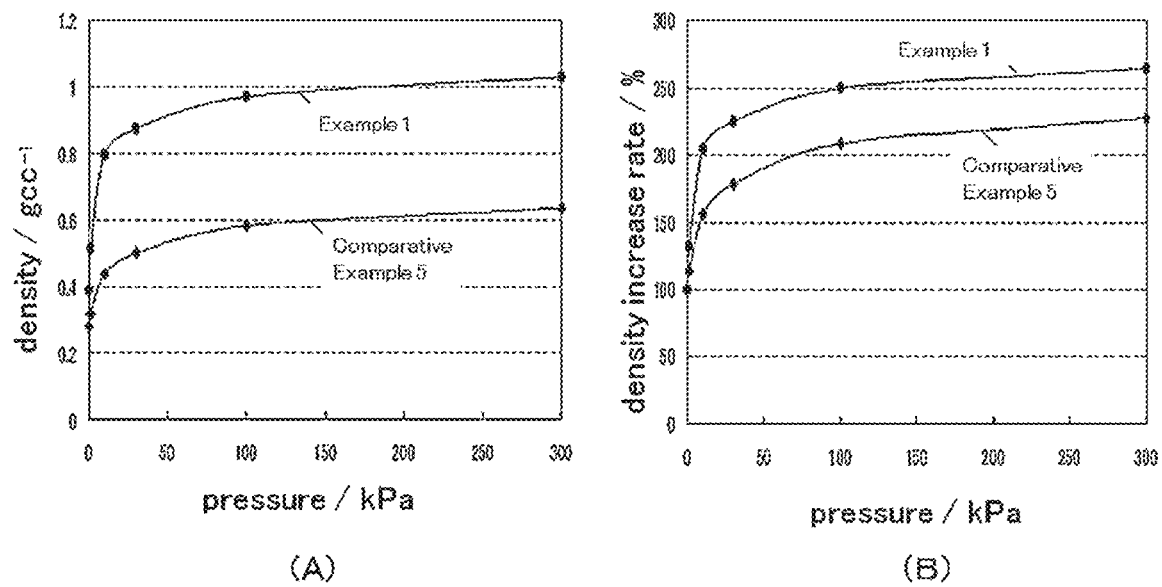
FIG. 16 shows graphs that show the result of surveying the influence of the pressure on conductive carbons of a working example and a comparative example: (A) shows the relationship between the pressure and density and (B) shows the relationship between the pressure and the increased rated of density.

For each of the conductive carbon of Example 1 and the conductive carbon (the carbon raw material) of Comparative Example 5, the conductive carbon and polyvinylidene fluoride were added to an adequate quantity of N-methyl pyrrolidone at the ratio of 70:30 and kneaded sufficiently so that slurry was formed, and this slurry was coated on an aluminum foil, dried and then given a rolling treatment. FIG. 16 is a graph that shows the result of investigating the influence of pressure by the rolling treatment on carbon density; (A) shows the relationship between pressure and density and (B) shows the relationship between pressure and the rate of increase in density, respectively. As is evident from FIG. 16, the conductive carbon of Example 1 has a higher density, even before pressure is applied, than the conductive carbon of Comparative Example 5. Also, the conductive carbon of Example 1 is significantly more affected by pressure than the conductive carbon of Comparative Example 5 and undergoes a large rate of increase in density with increasing of pressure; when the pressure is 25 kPa, the rate of increase in density exceeds 200%. Therefore, it is found that, if a rolling treatment is given under the condition of the same pressure, the conductive carbon of Example 1 is more densely compressed than the conductive carbon of Comparative Example 5. From this it can be understood that, if an electrode is produced with an electrode material containing the conductive carbon of Example 1, the conductive carbon of Example 1 is densely compressed by a rolling treatment, the particles of an active material approach each other, and electrode density is improved.

(iii) Relationship Between Pressure and Conductivity

Figure 17:
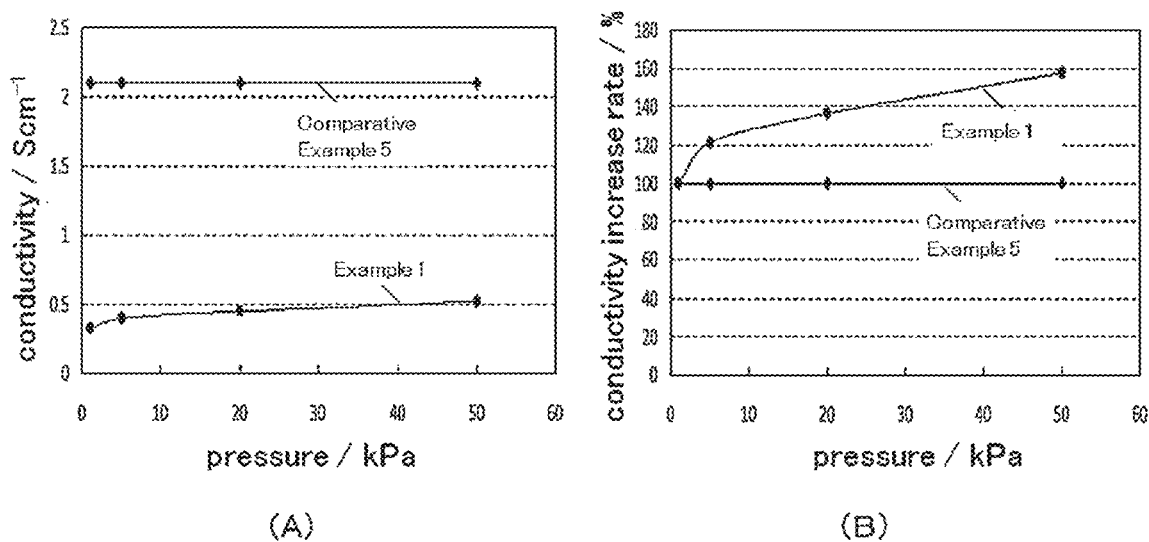
FIG. 17 shows graphs that show the result of surveying the influence of the pressure on conductive carbons of a working example and a comparative example: (A) shows the relationship between the pressure and electroconductivity and (B) shows the relationship between the pressure and the increased rate of electroconductivity.

For each of the conductive carbon of Example 1 and the conductive carbon (the carbon raw material) of Comparative Example 5, the conductive carbon and polytetrafluoroethylene were added to an adequate quantity of N-methyl pyrrolidone at the ratio of 70:30 and kneaded sufficiently so that slurry was formed, and this slurry was shaped in a sheet-like manner, dried and then given a rolling treatment. FIG. 17 is a graph that shows the result of investigating the influence of pressure by the rolling treatment on carbon conductivity; (A) shows the relationship between pressure and conductivity and (B) shows the relationship between pressure and the rate of increase in conductivity. As is evident from FIG. 17, the conductive carbon of Example 1 has lower conductivity than the conductive carbon of Comparative Example 5, but the conductivity is increased in accordance with the increase in pressure because density is increased by the rolling treatment. When an electrode is produced with an electrode material containing the conductive carbon of Example 1, the conductive carbon of Example 1 spreads in a paste-like manner on the surface of the particles of the active material and the contact area of the conductive carbon and the particles of the active material increases, and this conductive carbon that is spread in a paste-like manner is densely compressed due to contact with the particles of the active material and the conductivity of the conductive carbon is improved.

(6) Mixing State of Conductive Carbon and Active Material

The following experiment was performed to confirm the mixing state of an active material and carbon.

(i) Mixture of Fine Particles and Carbon

Figure 18:
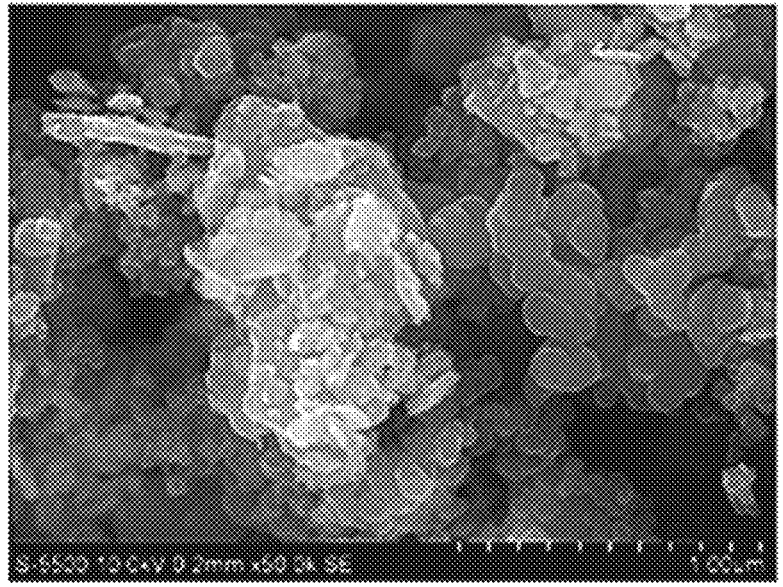
FIG. 18 shows SEM images at a magnification of 50,000 of a mixture that is obtained by dry blending of conductive carbon of a working example or acetylene black and fine particles of an active material.
Figure 18:
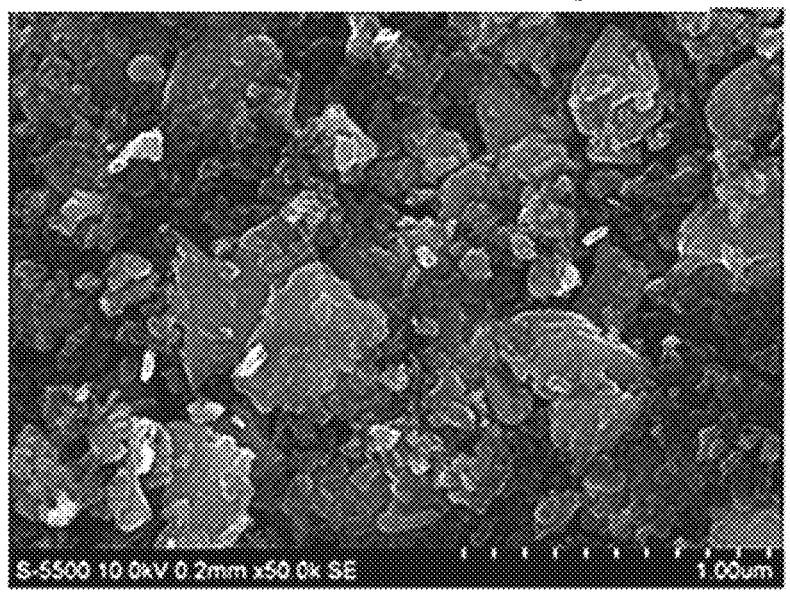

Each of the conductive carbon of Example 1 and acetylene black was introduced into a mortar with $LiNi_{0.5}Mn_{0.3}Co_{0.2}O_2$ fine particles with an average particle diameter of 0.32 µm at the ratio by mass of 20:80 and dry blending was conducted. FIG. 18 shows SEM images at a magnification of 50,000. It was found that, when acetylene black is used as carbon, compared with the case where the conductive carbon of Example 1 is used, fine particles aggregate even under the same mixing condition. Therefore, it was found that the conductive carbon of Example 1 effectively inhibits the aggregation of fine particles.

(ii) Mixture of Gross Particles and Carbon

Figure 19:
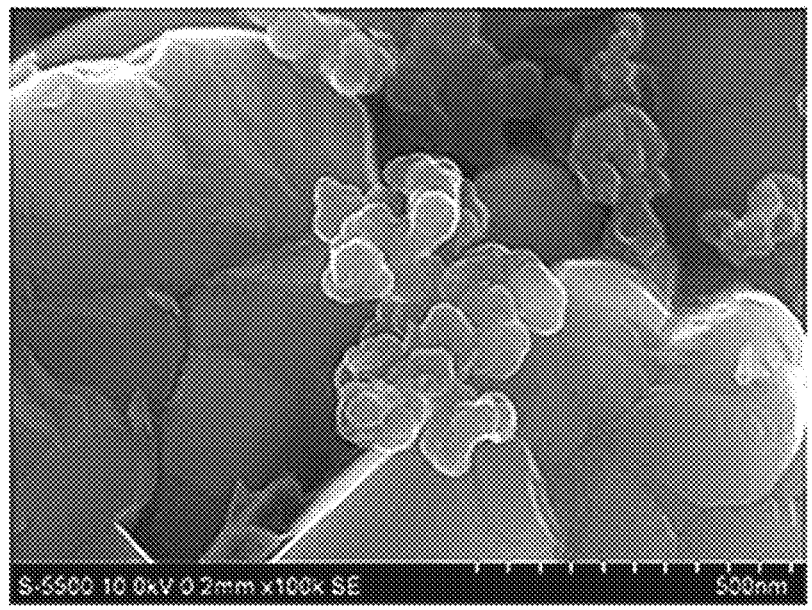
FIG. 19 shows SEM images at a magnification of 100,000 of a mixture that is obtained by dry blending of conductive carbon of a working example or acetylene black and gross particles of an active material.
Figure 19:
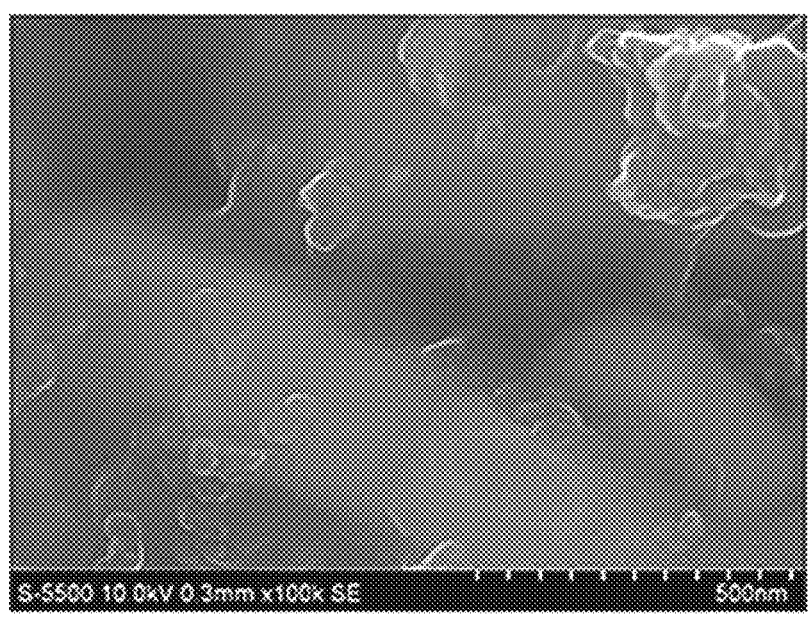

Each of the conductive carbon of Example 1 and acetylene black was introduced into a mortar with $LiNi_{0.5}Mn_{0.3}Co_{0.2}O_2$ gross particles with an average particle diameter of 5 µm at the ratio by mass of 4:96 and dry blending was conducted. FIG. 19 shows SEM images at a magnification of 100,000. It was found that, when acetylene black is used as carbon, the gross particles and acetylene black exist separately, but when the conductive carbon of Example 1 is used, the gross particles are covered by a paste-like object, and the outline form of the gross particles is not clearly identifiable. This paste-like object is the conductive carbon of Example 1 that spreads while covering the surface of the gross particles due to the pressure of mixing. It is considered that, by a rolling treatment when an electrode is produced, the conductive carbon of Example 1 further spreads in a paste-like manner and becomes dense while covering the surface of the particles of the active material, the particles of the active material approach each other, and accordingly, the conductive carbon of Example 1 is pushed out into the gaps formed between the adjacent particles of the active material and fills the gaps densely while covering the surface of the particles of the active material, so that the amount of the active material per unit volume in the electrode is increased and the electrode density is increased.

INDUSTRIAL APPLICABILITY

By using the conductive carbon of the present invention, an electric storage device with a high energy density can be obtained.

What is claimed is:

1. A method of producing an electrode material for an electric storage device comprising oxidized conductive carbon and particles of an electrode active material, comprising:
　　a carbon-oxidizing step of obtaining the oxidized conductive carbon by giving an oxidizing treatment to a carbon raw material so that the oxidized conductive carbon has a hydrophilic part in the amount of 10% mass or more of the entire oxidized conductive carbon; and
　　a combining step of mixing the oxidized conductive carbon obtained in the carbon-oxidizing step with the particles of an electrode active material so that at least part of the oxidized conductive carbon is deformed into a paste-like state by a pressure added to the oxidized conductive carbon during the combining step and the deformed oxidized conductive carbon is attached to a surface of the particles of an electrode active material.

2. The method of producing an electrode material for an electric storage device according to claim 1, wherein dry mixing is carried out in the combining step.

3. The method of producing an electrode material for an electric storage device according to claim 1, wherein the oxidizing treatment is carried out so that the oxidized conductive carbon has the hydrophilic part in the amount of 12% mass or more of the entire oxidized conductive carbon in the carbon-oxidizing step.

4. The method of producing an electrode material for an electric storage device according to claim 1, wherein the carbon raw material has 200 $m^2/g$ or more of a specific surface area of micropores having a diameter of 2 nm or less as measured by the MP method.

5. The method of producing an electrode material for an electric storage device according to claim 4, wherein the carbon raw material is selected from a group consisting of Ketjen Black and furnace black with pores.

6. The method of producing an electrode material for an electric storage device according to claim 1, wherein the particles of an electrode active material have an average diameter of more than 2 µm and not more than 25 µm.

7. The method of producing an electrode material for an electric storage device according to claim 1, wherein the ratio by mass of the particles of an electrode active material and the oxidized conductive carbon is within the range of 95:5 to 99:1.

8. The method of producing an electrode material for an electric storage device according to claim 1, wherein the electrode material further comprises other conductive carbon having higher electroconductivity than the oxidized conductive carbon, and the other conductive carbon is mixed with the oxidized conductive carbon and the particles of an electrode active material in the combining step so that the deformed oxidized conductive carbon is attached to a surface of particles of the other conductive carbon as well as the surface of the particles of an electrode active material.

9. The method of producing an electrode material for an electric storage device according to claim 8, wherein dry mixing is carried out in the combining step.

10. The method of producing an electrode material for an electric storage device according to claim 8, wherein the ratio by mass of the particles of an electrode active material and a total of the oxidized conductive carbon and the other conductive carbon is within the range of 95:5 to 99:1.

11. A method of producing an electrode for an electric storage device, comprising:
 a mounting step of forming an active material layer by applying the electrode material produced by the method according to claim 1 on a current collector for the electrode; and
 a pressurizing step of adding pressure to the active material layer formed in the mounting step so that the oxidized conductive carbon is further deformed into the paste-like state.

12. The method of producing an electrode for an electric storage device according to claim 11, wherein the active material layer formed in the mounting step is pressurized in the pressurizing step so that the deformed oxidized conductive carbon is pushed out not only into gaps that are formed between the adjacent particles of an electrode active material but also into pores that exist on the surface of the particles of an electrode active material and fills the gaps and the pores while covering the surface of the particles of an electrode active material.

13. The method of producing an electrode for an electric storage device according to claim 12, wherein the particles of an electrode active material have the gaps with a width of 50 nm or less and/or the pores with a width of 50 nm or less.

14. The method of producing an electrode for an electric storage device according to claim 11, wherein the active material layer in which the deformed oxidized conductive carbon has pores with a diameter of 5 to 40 nm is obtained in the pressurizing step.

15. The method of producing an electrode for an electric storage device according to claim 11, wherein the active material layer in which 80% or more of the surface of the particles of an electrode active material contact the deformed oxidized conductive carbon is obtained in the pressurizing step.

16. A method of producing an electrode for an electric storage device, comprising:
 a mounting step of forming an active material layer by applying the electrode material produced by the method according to claim 8 on a current collector for the electrode; and
 a pressurizing step of adding pressure to the active material layer formed in the mounting step so that the oxidized conductive carbon is further deformed into the paste-like state.

17. The method of producing an electrode for an electric storage device according to claim 16, wherein the active material layer formed in the mounting step is pressurized in the pressurizing step so that the deformed oxidized conductive carbon is pushed out not only into gaps that are formed between the adjacent particles of an electrode active material but also into pores that exist on the surface of the particles of an electrode active material and fills the gaps and the pores while covering the surface of the particles of an electrode active material.

18. The method of producing an electrode for an electric storage device according to claim 17, wherein the particles of an electrode active material have the gaps with a width of 50 nm or less and/or the pores with a width of 50 nm or less.

19. The method of producing an electrode for an electric storage device according to claim 16, wherein the active material layer in which the deformed oxidized conductive carbon has pores with a diameter of 5 to 40 nm is obtained in the pressurizing step.

20. The method of producing an electrode for an electric storage device according to claim 16, wherein the active material layer in which 80% or more of the surface of the particles of an electrode active material contact the deformed oxidized conductive carbon is obtained in the pressurizing step.

* * * * *